US012164635B2

(12) United States Patent
Jain et al.

(10) Patent No.: US 12,164,635 B2
(45) Date of Patent: Dec. 10, 2024

(54) USER-CENTRIC CLASSIFICATIONS FOR CRYPTOGRAPHIC TOKEN SETS

(71) Applicant: Emoji ID, LLC, Oakland, CA (US)

(72) Inventors: Naveen Kumar Jain, Nashville, TN (US); Riccardo Paolo Spagni, Plettenburg (ZA); Tal Flanchraych, Los Angeles, CA (US); Shradha Rao, London (GB); Karim Balaa, Ottawa (CA)

(73) Assignee: EMOJI ID, LLC, Nashville, TN (US)

( * ) Notice: Subject to any disclaimer, the term of this patent is extended or adjusted under 35 U.S.C. 154(b) by 313 days.

(21) Appl. No.: 17/813,892

(22) Filed: Jul. 20, 2022

(65) Prior Publication Data

US 2023/0252149 A1    Aug. 10, 2023

Related U.S. Application Data

(63) Continuation-in-part of application No. 17/651,755, filed on Feb. 18, 2022, now Pat. No. 11,488,265.

(60) Provisional application No. 63/267,580, filed on Feb. 4, 2022.

(51) Int. Cl.
    *G06F 21/56* (2013.01)
    *H04L 9/32* (2006.01)

(52) U.S. Cl.
    CPC .......... *G06F 21/566* (2013.01); *H04L 9/3213* (2013.01); *G06F 2221/034* (2013.01)

(58) Field of Classification Search
    CPC ................... G06F 21/56; G06F 21/566; G06F 2221/034; H04L 9/32; H04L 9/3213
    See application file for complete search history.

(56) References Cited

U.S. PATENT DOCUMENTS

| | | | |
|---|---|---|---|
| 11,139,955 | B1 | 10/2021 | So et al. |
| 11,141,664 | B1 | 10/2021 | Koch |
| 2015/0199640 | A1* | 7/2015 | Saxena .......... G06Q 10/063114 705/7.15 |
| 2016/0350861 | A1 | 12/2016 | Loughlin-Mchugh et al. |
| 2020/0273048 | A1* | 8/2020 | Andon .................. G06Q 10/02 |
| 2021/0110386 | A1 | 4/2021 | Meyer et al. |

(Continued)

FOREIGN PATENT DOCUMENTS

AU    2010350746 A1 * 11/2012 ............. A63F 13/31

*Primary Examiner* — Jayesh M Jhaveri
(74) *Attorney, Agent, or Firm* — Perkins Coie LLP; Colin Fowler; McKenzie Chen

(57) ABSTRACT

Embodiments disclosed herein relate to user-centric security classifications of cryptographic token sets that represent a prediction of whether a token set is malicious. A user-centric security classification of a token set is generated according to user behaviors that characterize users involved with the token set, including users holding tokens of the token set and users creating tokens of the token set. A model is trained to recognize user behaviors of certain users whose involvement with the token set increase the likelihood that the token set is non-malicious and secure. Such user behaviors that the model is trained to recognize include high time-rank behaviors, or holding onto cryptographic tokens for extended lengths of time. Upon generation of a user-centric security classification for a token set, graphical displays of tokens or of the token set are updated to reflect the user-centric security classification.

20 Claims, 27 Drawing Sheets

(56) References Cited

U.S. PATENT DOCUMENTS

2021/0342836 A1* 11/2021 Cella ................... H04L 9/3239
2022/0067799 A1*  3/2022 Soderstrom ...... G06Q 20/40155
2022/0122050 A1   4/2022 Pacella et al.
2022/0393873 A1* 12/2022 Holland ............ G06Q 20/3678

* cited by examiner

USER-CENTRIC CLASSIFICATIONS FOR CRYPTOGRAPHIC TOKEN SETS

CROSS-REFERENCE TO RELATED APPLICATIONS

This application claims priority to and the benefits of U.S. Non-Provisional application Ser. No. 17/651,755 entitled "TIME-BASED LEADERBOARD DISPLAY ON SOCIAL MEDIA NETWORK" filed on Feb. 18, 2022, which claims priority to U.S. Provisional Application No. 63/267,580 entitled "TIME-BASED LEADERBOARD DISPLAY ON SOCIAL MEDIA NETWORK" filed on Feb. 4, 2022. The entire disclosures of the aforementioned applications are hereby incorporated by reference as part of the disclosure of this application.

TECHNICAL FIELD

The disclosure relates to presentation of competitive leaderboards. The disclosure more specifically relates to gamification of metadata related to digital objects tracked on a distributed network.

BACKGROUND

Web 3.0 features enable tracing associations of digital objects on a distributed network over time. Metadata exists describing a timestamp that a given user obtains a particular digital object, how long they've held the digital object, and where that digital object came from. Social networking platforms do not make effective use of Web 3.0 features.

DETAILED DESCRIPTION

Figure 1:
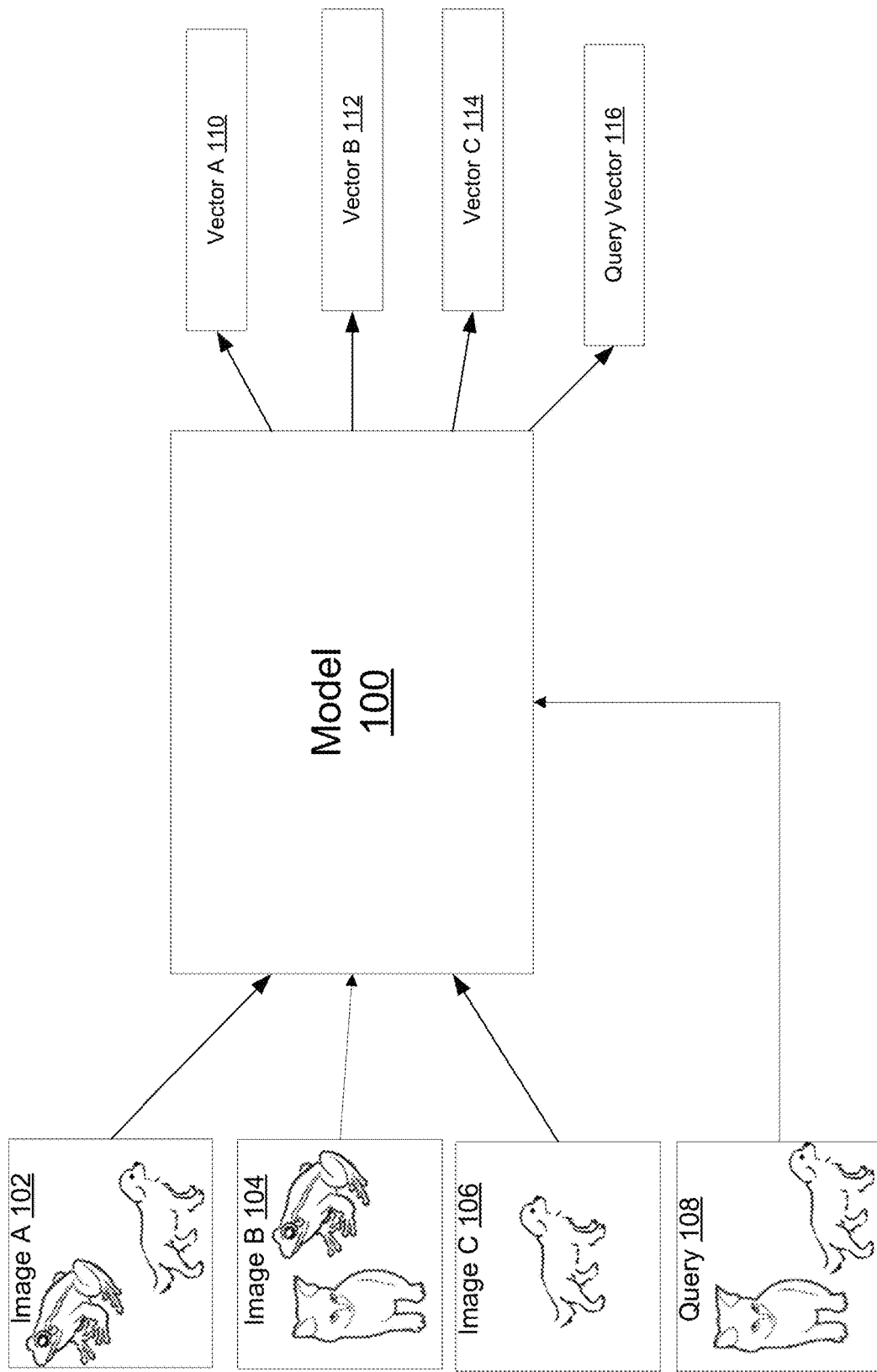
FIG. 1 is an illustration of a sample few-shot model configured to derive graphic features.

The behavior of owners of digital objects is to frequently trade their digital objects and cause significant turnover of those objects. The constant turnover of digital objects is not an ideal ecosystem for creators of said digital objects. Thus, it behooves such creators to make use of a gamified mechanic for digital objects that encourages holding on to those digital objects for extended periods. One such mechanic is a time-based leaderboard.

For a given set of digital objects, a leaderboard indicates how long a given user has held that digital object and ranking the users based on that length of time. In some embodiments, the leaderboard uses an absolute timeclock for a given digital object. In some cases, users will hold multiple digital objects from a given set of digital objects. Thus, in some embodiments, the leaderboard uses a time-clock connected to the length of time a given user contiguously holds a digital object from a given collection of digital objects (e.g., the objects do not need to contiguously need to be the same but are from the collection).

In some embodiments, the leaderboard sorts ties based on number of digital objects from the collection held or based on staking of digital objects. When a digital object is "staked," that object is transferred to a holding user for a predetermined length of time. Staking a digital object is akin to locking the object away in a vault for a period of time. While staked with the holding user, the original user cannot trade the digital object. While staking of a digital object technically transfers the digital object away from the original user, for purposes of the leaderboard, the digital object is considered contiguously controlled by the original user.

The leaderboard enables social benefits and loyalty rewards such as getting early or exclusive access to future distributions of digital objects and anything the creator wants to incentivize loyalty (a velocity sink) and award reputational benefits.

Additionally disclosed herein is a generator of unique, procedurally generated digital objects that makes use of user specific parameters. Computers can generate unique digital output quite easily through the use randomizing elements. This type of output results in something that is strictly unique or seemingly unique, but a human viewer is not necessarily going to appreciate the output as unique. Depending on the style of the output, the uniqueness manifests in different ways. For purposes of ease of disclosure, this application largely focuses on graphical elements, but textual, audio, or multimedia elements are similarly implementable.

Prior art techniques have made use of preset elements that are reused in a random order. This sort of process is ultimately subject to the size of the presets used, but nevertheless, often appears to output similar digital objects over time. A way to overcome the similarity between output is to unbound the input such that each user is able to submit their own input, based on user specific parameters. While the algorithm for generating the procedural digital object does not change, the varied input enables more unique objects to be created. Further, the digital objects created are more personalized to those who instigate the generation.

With respect to user submitted input on "unique" output, a platform needs a scheme to address the potential of double submission of the same input. In some embodiments, input is validated such that an exact set of input may only be submitted once. In some embodiments, a user is validated such that that user may only submit input once (and in a manner, the user themselves acts as the variation in input). In some embodiments, a randomization element is applied to each submission. The randomization element (e.g., a salt) is implementable in a number of ways. In some embodiments, the salt changes the manner of procedural generation based on the input. In some embodiments, the salt is treated in the same manner as the input and acts an additional element of input.

A specific example of an embodiment of the present invention relates to the generation of cryptographic tokens, or more specifically non-fungible cryptographic tokens (NFT). In some embodiments, the procedurally generated digital object is generated based on existing elements in a cryptographic wallet. A given cryptographic wallet has a number of NFTs present therein. The generator of digital objects interprets the various cryptographic protocols related to the NFTs present in the wallet, identifies content associated therewith, and procedurally generates a new NFT based on the existing ones present in the wallet.

Examples of uses of digital objects include as collectors items, tickets for events, identity information, art, and/or social networking or community building tokens.

Artificial Intelligence and Few-Shot Models

Artificial intelligence models often operate based on extensive and enormous training models. The models include a multiplicity of inputs and how each should be handled. Then, when the model receives a new input, the model produces an output based on patterns determined from the data it was trained on. Few-shot models use a small number of inputs (a support set) to identify some information about a query input.

The term "few-shot" refers to a model that is trained to interpret a few sources of input data that the model has not necessarily observed before. Few-shot is shorthand for stating that the model has "a few shots" to determine what the user is seeking. "A few" does not necessarily refer to "three" as is often applied, but a relatively small number when compared to other models known in the art. Few-shot learning (FSL) refers to the training of ML algorithms using a very small set of training data (e.g., a handful of images), as opposed to the very large set that is more often used. This commonly applies to the field of computer vision, where it is desirable to have an object categorization model work well without thousands of training examples.

FSL is utilized in the field of computer vision, where employing an object categorization model still gives appropriate results even without having several training samples. For example, where a system categorizes bird species from photos, some rare species of birds may lack enough labeled pictures to be used as training images. Consequently, if there is a classifier for bird images, with the insufficient amount of the dataset, a solution would employ FSL.

In some embodiments, a few-shot model uses 10 or fewer input examples, 20 or fewer, 100 or fewer input examples, or 5-7 input examples. When applied to graphic element/feature identification, the number of input examples may be directly correlated with the number of graphic features that are possible in queries. The referenced input examples differ from those the model is trained with in that those examples used during the few-shot do not necessarily have any relationship (with the exception of having a comparable data type, like the use of ASCII characters, or image data). The training of the model is premised in teaching the model how to quickly adapt to new training examples, rather than to recognize a given input strictly based on examples that it has seen during training. Rather than evaluate individual inputs, the few-shot model is trained to evaluate few-shots—specifically relationships that exist between the various examples within the few-shot.

Previous work on FSL requires that each example in the support set (examples for the model to adapt quickly to) contain only a single label. For example, suppose a model can quickly learn to classify images of a rare bird species. Prior work requires that each image in the support set contain a single bird. Other work relating to few-shot models and relation network models include the following references:

Yutian Chen, Yannis M. Assael, Brendan Shillingford, David Budden, Scott E. Reed, Heiga Zen, Quan Wang, Luis C. Cobo, Andrew Trask, Ben Laurie, Çaglar Gülçehre, Aaron van den Oord, Oriol Vinyals, and Nando de Freitas. *Sample Efficient Adaptive Text-to-Speech*. CoRR, abs/1809.10460, 2018.

Chelsea Finn, Pieter Abbeel, and Sergey Levine. *Model-Agnostic Metalearning for Fast Adaptation of Deep Networks*. CoRR, abs/1703.03400, 2017.

Gregory R. Koch. Siamese Neural Networks for One-Shot Image Recognition. 2015.

Scott E. Reed, Yutian Chen, Thomas Paine, Aaron van den Oord, S. M. Ali Eslami, Danilo Jimenez Rezende, Oriol Vinyals, and Nando de Freitas. *Few-shot Autoregressive Density Estimation: Towards Learning to Learn Distributions*. CoRR, abs/1710.10304, 2017.

Florian Schroff, Dmitry Kalenichenko, and James Philbin. *Facenet: A Unified Embedding for Face Recognition and Clustering*. CoRR, abs/1503.03832, 2015.

Flood Sung, Yongxin Yang, Li Zhang, Tao Xiang, Philip H. S. Torr, and Timothy M. Hospedales. *Learning to Compare: Relation Network for Few-shot Learning*. CoRR, abs/1711.06025, 2017.

Oriol Vinyals, Charles Blundell, Timothy P. Lillicrap, Koray Kavukcuoglu, and Daan Wierstra. *Matching Networks for One Shot Learning*. CoRR, abs/1606.04080, 2016.

Few-shot models typically make use of convolutional neural networks pre-trained for feature extraction. Pretraining includes a large amount of media training data. Output of the pretraining model is a set of vectors. Training for such a network may implement supervised learning or with a Siamese network. Different manners of training will affect output prediction accuracy. The output vectors are normalized in order to establish a common output type for purposes of comparison.

FIG. 1 is an illustration of a sample few-shot model 100 configured to derive graphic features. The sample illustrated is a simplistic implementation utilizing relatively few, and easy to recognize graphic features. This disclosure is not limited to such simple implementations and the relevant models may be configured to operate and identify more complex sets of graphic features.

In the example, model 100, is a few-shot model designed to identify and categorize graphic features that are received. In some embodiments, the model 100 is configured with a set list of graphic features to observe (indicated by a graphic feature matrix). In other embodiments, Model 20 includes no explanation what a support set includes and instead merely identifies similar patterns in pixels.

The illustration of FIG. 1 includes a three-image support set 102, 104, 106 and a single query image 108. The images include some combination of three graphical features depicting a frog, a cat, or a dog. When each image 102, 104, 106, 108 is supplied to the model 100, the model 100 generates a respective vector that describes the image content. Each vector 110, 112, 114, 116 includes a set of dimensions that together are indicative of the graphic content of the images 102, 104, 106, 108. Image A 102 corresponds to vector A 110. Image B 104 corresponds to vector B 112. Image C 106 corresponds to vector C 114. The query image 108 corresponds to the query vector 116. In some embodiments, the support set vectors 110, 112, 114 and the query vector 116 are a predetermined number of dimensions in length. Dimensions may relate directly to graphical features on a one-to-one basis, or multiple dimensions may be used to describe a given graphic feature.

As depicted in the figure, the query image 108 does not include a combination of graphic features that exist in any of the support set. Each feature exists in the support set, but not necessarily by itself, or with an exact same combination. While a human observer can readily identify the content of the query image, the image identification system is taught how to identify via few-shot models.

References to "a model" as discussed herein may refer to a heuristic model, an artificial intelligence model, a neural network, a convolutional neural network, a hidden Markov model, an FSL model, or another suitable ML model known in the art.

Cryptographic Platforms

Public and private keys are an integral component of cryptocurrencies built on blockchain networks and are part of a larger field of cryptography known as public-key cryptography (PKC) or asymmetric encryption. The goal of PKC is to easily transition from a first state (e.g., a private key) to a second state (e.g., a public key) while reversing the transition from the second state to the first state nearly impossible, and in the process, proving possession of a secret key without exposing that secret key. The product is subsequently a one-way mathematical function, which makes it ideal for validating the authenticity of transactions such as cryptocurrency transactions because possession of the first state such as the secret key cannot be forged. PKC relies on a two-key model, the public and private key.

The general purpose of PKC is to enable secure, private communication using digital signatures in a public channel that is susceptible to potentially malicious eavesdroppers. In the context of cryptographic tokens, the goal is to prove that a traded token was indeed signed by the owner of that token, and was not forged, all occurring over a public blockchain network between peers. A private key of a blockchain wallet unlocks the right for the blockchain wallet's owner to spend transfer tokens in the blockchain wallet and therefore must remain private. A wallet address of the blockchain wallet is cryptographically linked to the blockchain wallet's private key and is publicly available to all users to enable other users to send NFTs to the user's blockchain wallet. For example, the wallet address may be a public key generated from the blockchain wallet's private key using one or more PKC algorithms. Public keys are generally used to identify wallets, whereas the private keys are used to authorize actions of the respective wallet.

Wallet addresses for blockchain wallets are typically represented in human-legible form in one of three ways: as a hexadecimal representation, as a Base64 representation, or as a Base58 representation. In each of these common ways of representing the wallet addresses, each wallet address is represented using a string of letters and numbers, typically exceeding 20 characters in length. The length and randomness of the alphanumeric string makes the wallet address unwieldy and difficult to remember, thereby decreasing its usability and hindering the adoption of cryptocurrencies.

Structurally, in some embodiments, customized, flexible cryptographic tokens connected to a smart contract are powered by a less flexible, base cryptocurrency. Miners operating on the network for the base cryptocurrency power execution of a distributed application (dApp) or smart contract. The smart contract is held by an administrative user and includes all of the custom cryptographic tokens. The custom cryptographic tokens do not "move" in the same sense that the base cryptocurrency moves via transactions. The smart contract is "held" by the administrative user though secondary users may interact with the smart contract and various portions (specific tokens) may be attributed to those secondary users.

Figure 2:
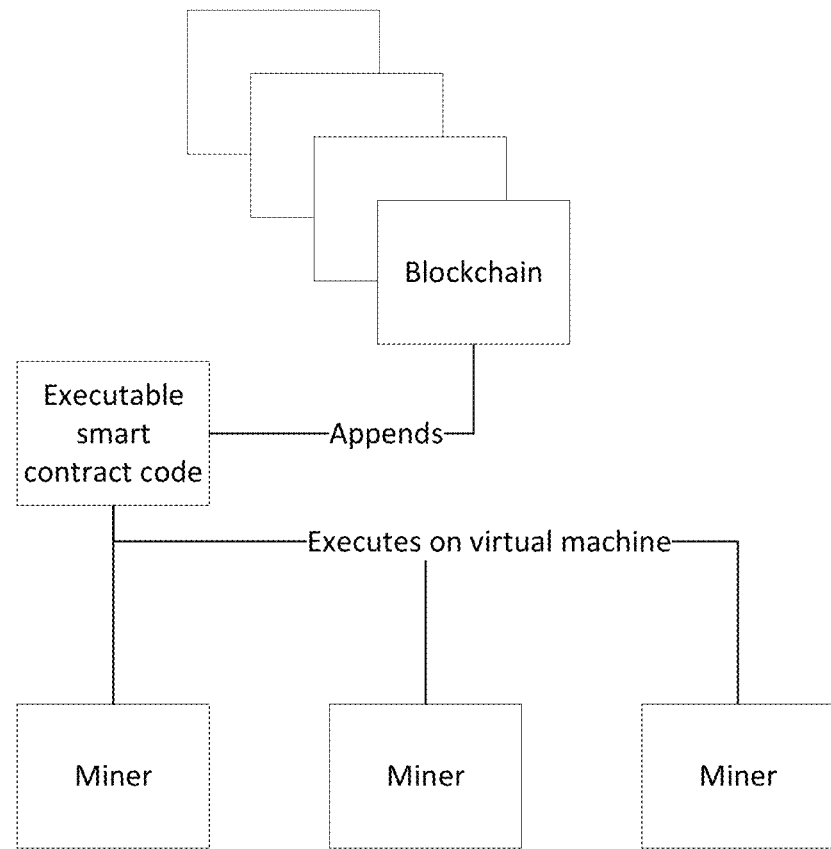
FIG. 2 is a block diagram illustrating a data structure of a smart contract.

FIG. 2 is a block diagram illustrating a data structure of a smart contract. Smart contracts and dApps execute on an Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Ethereum coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require few computational resources. For example, at the time of writing, a multiplication instruction requires 5 gas, whereas an addition instruction requires 3 gas. Conversely, more complex instructions, such as a Keccak256 cryptographic hash requires 30 initial gas and 6 additional gas for every 256 bits of data hashed.

The purpose of gas is pay for the processing power of the network on execution of smart contracts at a reasonably steady rate. That there is a cost at all ensures that the work/processing being performed is useful and valuable to someone. Thus, the Ethereum strategy differs from a Bitcoin transaction fee, which is only dependent on the size in kilobytes of a transaction. As a result that Ethereum's gas costs are rooted in computations, even a short segment of code can result in a significant amount of processing performed. The use of gas further enforces incentivizes coders to generate efficient smart contracts/algorithms. Otherwise, the cost of execution may spiral out of control. Unrestricted, an exponential function may bankrupt a given user.

While operations in the EVM have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no matter to the miner.

Where a high gas price is attached to a transaction, the transaction will be given priority. Miners will process transactions in order of economic value. Priority on the Ethereum blockchain works similarly as with the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain are ERC-20 tokens (Ethereum Request for Comment-20). ERC-20 is a technical specification for fungible utility tokens. ERC-20 defines a common list of rules for Ethereum tokens to follow within the larger Ethereum ecosystem, allowing developers to accurately predict interaction between tokens. These rules include how the tokens are transferred between addresses and how data within each token is accessed. ERC-20 provides a framework for a means to build a token on top of a base cryptocurrency. In some embodiments herein, enhancements are built on top of the ERC-20 framework, though use of the ERC-20 technical specification is not inherently necessary and is applicable to circumstances where Ethereum is used as the base cryptocurrency.

Another type of smart contract that exists on the Ethereum blockchain are ERC-721 tokens (Ethereum Request for Comment-721). ERC-721 is a technical specification for NFTs. The ERC-721 introduces a standard for NFT. An ERC-721 token is unique and can have different exclusivity to another token from the same smart contract, maybe due to age, rarity or visuals.

NFTs have a uint256 variable called tokenId. Thus, for any ERC-721 contract, the pair contract address, uint256 tokenId must be globally unique. That said, a given dApp can have a "converter" that uses the tokenId as input and outputs an image.

Disclosure on token protocols has focused on Ethereum. As applicable in this disclosure, Ethereum is a base cryptocurrency. Other base cryptocurrencies exist now and in the future. This disclosure is not limited to application on specifically the Bitcoin or Ethereum blockchains.

CryptoKitties is an early example of an NFT platform. Users would engage in breeding and trading of cryptographic tokens that were visually represented by cartoon cats. Each cat had a family tree that was tracked by a blockchain and went back to the originator cats that digitally sired the subsequent cats. The visual representation of each cat had an appearance dictated by a number of preset options and was at least partly controlled by the visual appearance of the parent cat tokens.

Users would mate and auction cats as a game mechanic. When two cats mated, a third cat would be generated by the CryptoKitties dApp. The third cat was visually represented by some amalgamation of the features of the parents with the potential of a mutation (to potentially gain a particularly rare feature neither of the parents exhibited). Ultimately, generation of a cryptokitty is based on the user input of existing kitties, and kitties are the only acceptable datatype. That is to say, no other types of NFT are applicable. One cannot mate a cryptokitty with an emoji ID.

CryptoKitties had a number of viral features that were indicative of exclusivity. These features included particularly rare combinations of visual features and a lineage that was relatively close to an originator cat. In both cases, there was no algorithmic benefit for either of these exclusivity features.

While CryptoKitties does not implement any algorithmic connection to exclusivity features, some embodiments of the present invention do. It is frequently the case that exclusivity features of NFTs are connected to originator or early generation tokens. Additionally, tokens having rare visual features are considered exclusive. What generation a given NFT is, is identifiable using either metadata on the token itself combined with thresholds or heuristics regarding generational definitions or is identifiable by tracing back the token's generation through the respective blockchain of that token. Rarity of visual features is identified via a survey of existing tokens and the existing visual features thereof. Thus, in embodiments of the instant invention an evaluation is performed on each relevant token used as input that identifies the exclusivity features of that token, then those features are captured for use in generation of a new unique procedurally generated digital object (e.g., an NFT).

Emoji Sequence Based ID

Figure 3:
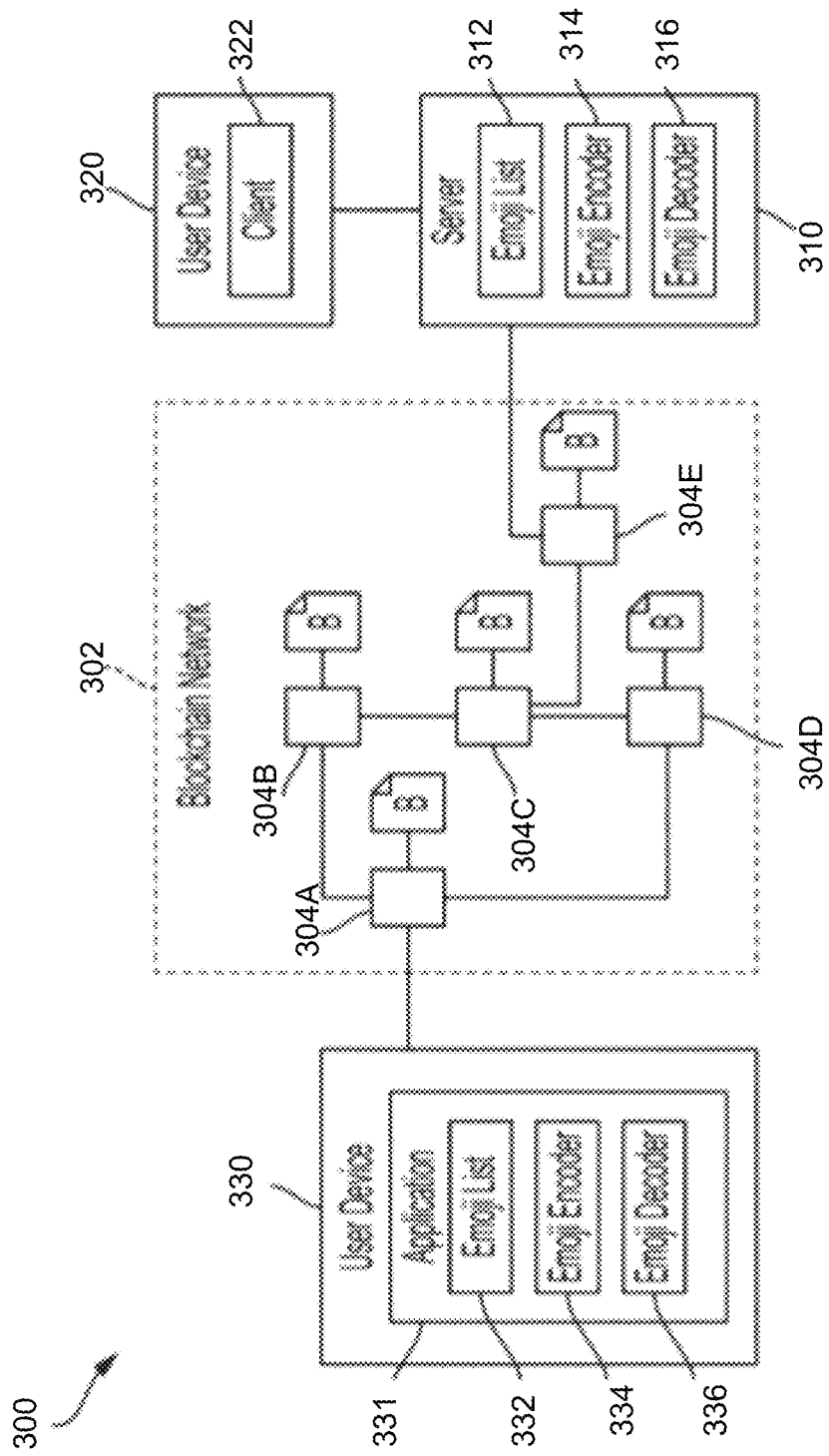
FIG. 3 illustrates a block diagram of a system for using emoji sequence IDs for identifying wallet addresses of blockchain wallets.

FIG. 3 illustrates a block diagram of a system 300 for using emoji sequence IDs for identifying wallet addresses of blockchain wallets. System 300 includes a blockchain network 302, user device 320, user device 330, and server 310.

As shown in FIG. 3, blockchain network 302 includes a plurality of nodes 304A-E (e.g., servers) that each maintain respective copies of a blockchain. In actual practice, blockchain network 302 may include hundreds or thousands of nodes. In some embodiments, blockchain network 302 may be a distributed peer-to-peer network as is known by those skilled in the art. In some embodiments, blockchain network 302 of nodes 304A-E implement known consensus algorithms to validate transactions submitted to blockchain network 302. A verified transaction may include transferred cryptocurrency, contracts, records, or other information to be recorded to the blockchain. In some embodiments, multiple transactions are combined together into a block of data that is verified across blockchain network 302. Once verified, this block of data can be added to an existing blockchain maintained by each of nodes 304A-E.

In some embodiments, a user can initiate transactions to be submitted to blockchain network 302 using user device 330. For example, the user may submit a transaction using application 331 configured to interact with blockchain network 302. For example, application 331 may generate and transmit cryptocurrency transactions to node 304A for validation and verification. Application 331 may include software downloaded from a digital distribution platform (e.g., App Store on Apple devices or Microsoft Store on Windows devices) or a content server. In some embodiments, application 331 provides a graphical user interface (GUI) that enables the user to generate transactions between his or her blockchain wallet and a blockchain wallet of a target recipient of cryptocurrency funds. Conventionally, the target recipient's blockchain wallet is identified by a wallet address in a human-legible textual representation. For example, the wallet address may be a string of numbers and/or characters such as in a hex format, a Base64 format, or a Base58 format. As described above, requiring the user to enter long strings of numbers and/or characters into application 331 to identify the wallet address of the target recipient is inefficient and prone to error.

In some embodiments, to enable the user to use an emoji sequence ID to uniquely identify a target wallet address for a blockchain wallet in cryptocurrency transactions, application 331 can implement an emoji list 332, an emoji encoder 334, and an emoji decoder 336.

In some embodiments, emoji list 332 can be stored in memory of application 331 and include a predetermined list of emojis that are used to enable use of emoji sequence IDs to identify wallet addresses of blockchain wallets. In some embodiments, the predetermined list includes a subset of emojis selected from the emojis in the Unicode Standard. For example, a give emoji list 332 includes 1626 emojis selected from the Unicode Standard. In some embodiments, 1626 emojis are selected because three emojis selected from 1626 emojis can uniquely map to a four-byte value. For example, an emoji ID of three emojis selected from 1626 emojis may include 1626{circumflex over ( )}3 unique emoji IDs, which is less than 0.1% more unique values than the total possible number of unique values (i.e., 2{circumflex over ( )}32) that can be represented by the four-byte (i.e., 32-bit) value. As will be understood by those skilled in the art, other numbers of emojis may be selected to be part of emoji list 332 to represent different number of bits. For example, an emoji list 332 having 46 emojis can represent an 11-bit value using two emojis (i.e., two emojis result in 46*46=2116 unique emoji IDs, which provides slightly more unique values than the possible values, 2048, of an 11-bit value).

In some embodiments, emojis in emoji list 332 may be selected to be visually dissimilar to reduce the likelihood that the user enters an incorrect emoji when entering the emoji sequence ID identifying the wallet address of the blockchain wallet. For example, the emojis may be selected such that no two emojis depict the slight variations of the same object. For example, a single emoji for a cat may be selected and included in emoji list 332 and not the multiple emojis depicting cats with different expression (e.g., grinning cat, cat with tears of joy, and pouting cat, etc.).

In some embodiments, to permit conversion between emoji IDs and integer values, emoji list 332 includes a plurality of emojis associated with a plurality of corresponding values. In some embodiments, emoji list 332 can be stored as an array, in which each emoji in the array has a corresponding index based on its position in the array. Therefore, each value associated with an emoji may be an index assigned to the emoji. In other embodiments, emoji list 332 may include a table that stores a plurality of emojis and that stores a plurality of values corresponding to the plurality of emojis. In these embodiments, emojis in emoji list 332 that are pictorially similar may be associated with the same value. In some embodiments, a set of emojis that is pictorially similar can include a plurality of emojis that depict types of the same object. For example, emoji list 332 may include multiple flag emojis that are each assigned an associated value of, for example, 9.

In some embodiments, application 331 can include an emoji mapping list that maps a larger number of emojis to the emojis in emoji list 332. For example, the emoji mapping list may include all available emojis in the Unicode Standard (i.e., 3,341 emojis as of January 2022). In some embodiments, by selecting mapping emojis to emojis in emoji list 332, two or more emojis that are pictorially similar may be mapped to the same emoji. For example, two or more emojis that show a clock depicting different types may be mapped to the same emoji of a clock. The use of an emoji mapping list may normalize the possible emojis to a list of emojis that are selected to be visually distinct to reduce error during user entry as well as to enhance the ease of visually verifying entered emoji sequence IDs.

In some embodiments, emoji encoder 334 can be configured to generate an emoji sequence ID that uniquely identifies a wallet address, which includes a predetermined number of bits (e.g., a 128-bit address or a 256-bit address). In other words, emoji encoder 334 can encode the wallet address into a sequence of emojis such that every wallet address is uniquely represented by exactly one sequence of emojis. Further, a valid emoji sequence ID represents exactly one wallet address. The encoding and decoding functions performed by emoji encoder 334 and emoji decoder 336, respectively, are symmetric functions. This means that encoding a wallet address, a, to its emoji sequence ID, s, and then applying the decoding function to emoji sequence ID, s, will always result in the originally encoded wallet address, a.

In some embodiments, to generate the emoji sequence ID, emoji encoder 334 can map a predetermined number of bits of the wallet address to a predetermined number of emojis selected from emoji list 332. In some embodiments, the predetermined number of bits of the wallet address can be divided into a plurality of non-overlapping groups of sequential bits. For example, the wallet address may be divided into 4-byte chunks. Then, emoji encoder 334 can convert each group of sequential bits into an emoji ID including a predetermined number of emojis based on emoji list 332. Finally, emoji encoder 334 can generate the emoji sequence ID identifying the wallet address by concatenating each emoji ID for each group of sequential bits into an emoji sequence.

In some embodiments, emoji encoder 334 can implement a mapping algorithm to convert the wallet address into the emoji sequence ID. For example, the mapping algorithm may include a BIP39 algorithm, an Electrum scheme algorithm, or a simple mapping from emoji index to a 10-bit value for emoji list 332 having at least 1024 emojis. In some embodiments, emoji encoder 334 can implement a mapping algorithm that uses indices of emojis in emoji list 332 to convert a numeric value to a predetermined number of emojis.

In some embodiments, to generate the emoji sequence ID, emoji encoder 334 may calculate a checksum value for the emoji sequence. For example, emoji encoder 334 may apply a checksum algorithm such as the Damm algorithm to calculate the checksum value. Then, emoji encoder 334 may convert the checksum value into an emoji representation including a predetermined number of emojis. Finally, emoji encoder 334 may output the emoji sequence ID identifying the wallet address by appending the emoji representation for the checksum to the emoji sequence previously calculated.

In some embodiments, emoji decoder 336 can be configured to generate a wallet address, which includes a predetermined number of bits (e.g., a 128-bit address or a 256-bit address), that is uniquely identified by an emoji sequence ID. In other words, emoji decoder 336 can decode the emoji sequence ID identifying the wallet address into a sequence of textual representations that uniquely corresponds to the wallet address. In some embodiments, the textual representation can correspond to an alphanumeric format for the wallet address that is required by blockchain network 302 to process cryptocurrency transactions. For example, the sequence of textual representations may be a hexadecimal string, a Base64 string, or a Base58 string.

In some embodiments, to generate the sequence of textual representations that identifies the wallet address, emoji decoder 336 can map the sequence of emojis in the emoji sequence ID to a numerical value identifying the wallet address based on emoji list 332. In some embodiments, emoji decoder 336 can determine the numerical value using emoji list 332 to identify a plurality of values corresponding to the plurality of emojis in the emoji sequence ID. For example, for an emoji in the emoji sequence ID, emoji decoder 336 may use an index of the emoji identified in emoji list 332 as a value associated with the emoji to be used in generating the numerical value. In some embodiments, emoji decoder 336 can convert a generated numerical value into the sequence of textual representations that uniquely identifies the wallet address.

In some embodiments, emoji decoder 336 can apply a checksum algorithm on the emoji sequence ID to determine whether the emoji sequence ID is valid. For example, emoji decoder 336 may apply the checksum algorithm to check whether the last emoji in the emoji sequence ID matches a result of the checksum algorithm applied to the emoji sequence ID excluding the last emoji. As described above with respect to emoji encoder 334, the last emoji may be generated to represent a checksum value of the emoji sequence ID. In some embodiments, if the checksum fails, emoji decoder 336 can halt processing because emoji sequence ID is invalid. In some embodiments, emoji decoder 336 can generate a notification indicating that the sequence ID is invalid.

In some embodiments, one or more emoji checksum can be extracted from the emoji sequence ID to generate a resultant emoji sequence. In some embodiments, the resultant emoji sequence can be divided into a plurality of non-overlapping groups of sequential emojis. For example, for an emoji list 332 having 1626 emojis, the result emoji sequence may be divided into groups of 3 emojis, with each group representing a 4-byte value. Then, emoji decoder 336 can convert each group of sequential emojis into a textual representation including a predetermined number of bits based on emoji list 332. Finally, emoji decoder 336 can generate the sequence of textual representations identifying the wallet address by concatenating each textual representation for each group of sequential emojis.

In some embodiments, functionality of application 331 may be performed elsewhere in system 300 such as on one or more of nodes 304A-E in blockchain network 302. In these embodiments, blockchain network 302 can be configured to be capable of processing transactions in which wallet addresses are identified using emoji sequence IDs. In some embodiment, an emoji sequence ID is a sequence of a plurality of emojis.

In some embodiments, functionality of application 331 may be performed elsewhere in system 300 such as on server 310. For example, server 310 includes emoji list 312, emoji encoder 314, and emoji decoder 316, which provides similar functionality as emoji list 332, emoji encoder 334, and emoji decoder 336, respectively. In some embodiments, server 310 may be a web server that enables users to operate a client 322 on user device 320 to access the functions of server 310. For example, client 322 may be a browser that enables the user to connect to a web portal or interface provided by server 310. Therefore, a user using user device 320 may initiate transactions to be verified by and added to blockchain network 302 via server 310.

Unique Digital Object Generation

Figure 4:
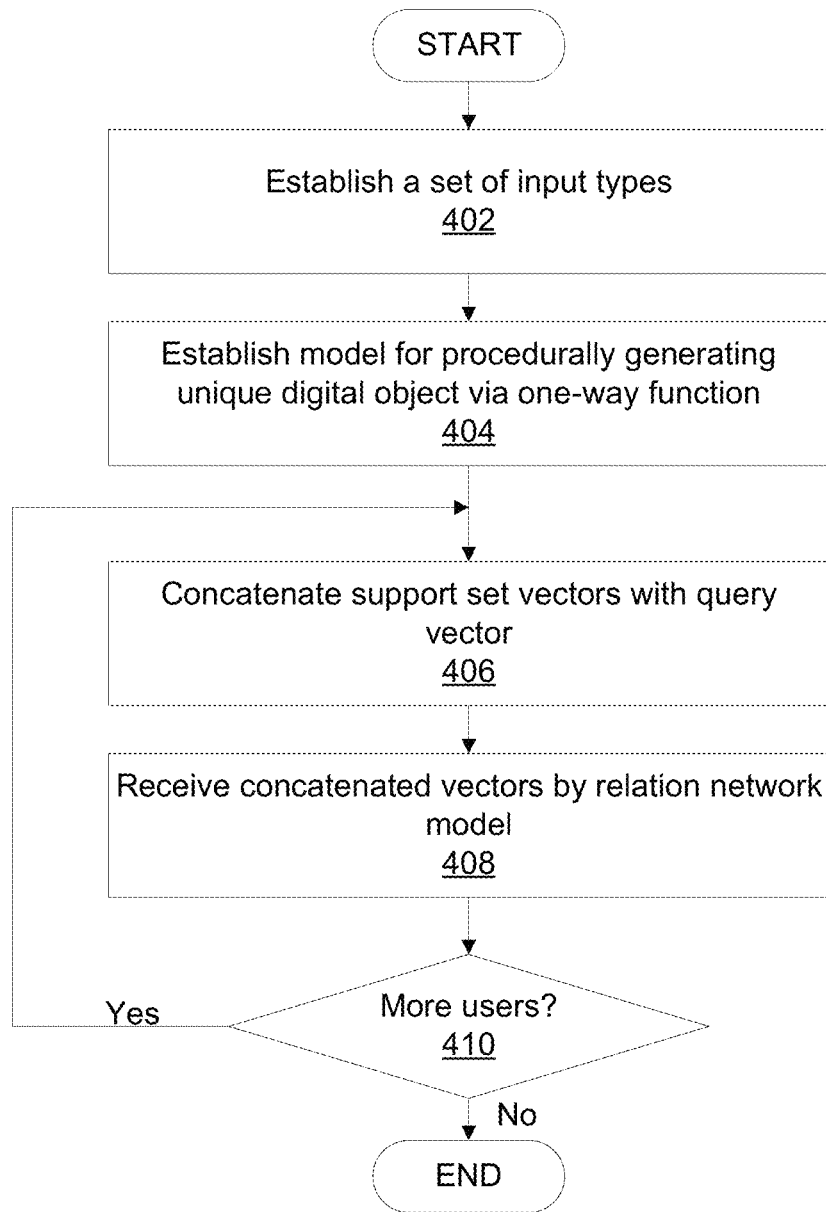
FIG. 4 is a flowchart illustrating platform generation of a unique procedurally generated object via user specific parameters.

FIG. 4 is a flowchart illustrating platform generation of a unique procedurally generated object via user specific parameters. In step 402, the digital object generator establishes a set of input types and parameters handled. Examples of the types of input include handled by various embodiments include any combination of cryptographic protocols, image data, or multimedia data.

Input handling refers to the types of input a given platform understands or recognizes. When designing input handling, the platform first recognizes what sort of input is given to it, and then when to do with the parameters of the input.

With reference to recognition of cryptographic protocols, a given input may be a cryptographic wallet, and the tokens associated therewith. In some cases, a given cryptographic wallet is associated with tokens from multiple cryptographic object types that each have their own smart contract, or blockchain upon which those objects are tracked. A common blockchain used for NFTs at the time of this application is the Ethereum blockchain. However, it is contemplated, that NFTs may operate on different blockchains in the future. A given token within a wallet typically has a call or an identifying feature that indicates which dApp the token is associated with.

With reference to image data, a given input may be a .jpeg or some other digital image format. In such examples, the file extension identifies what the input is, and the parameters thereof are identified via computer vision techniques. Similar input identification is applied to multimedia input.

Other data types may include user accounts, or game save files. Game save files often include data regarding characters the user has played, a total play time, items held by the user's character, choices the character has made, or other game related aspects. An example of a user account is a social media account, where data included relates to number of posts made, posts that had the highest amount of interaction (in any combination of negative/positive), number of followers, and other social media related aspects. Some embodiments of the present invention make use of these data types and parameters.

In step 404, the digital object generator establishes a model that procedurally converts the received user parameters and input into a digital object via a one-way function. The model used varies based on the style of input used. The process is ultimately transformative on the input and while, in some embodiments, the output may be indicative or reminiscent of the original input, computationally deriving the exact inputs from the output is not seen as a viable problem using modern computing techniques.

The simplest embodiment is a hash function the converts data embodied in a given format (e.g., binary, alphanumeric, ASCII, array of values, etc.) into a hash value. More complex embodiments make use of multiple models or schemes to convert multiple data types into a common data type/data structures and subsequently apply a model that generates an amalgamated output. For example, with respect to ERC-721 tokens, a model identifies exclusivity features of that ERC-721 token. The exclusivity features are identified via examination of the relevant smart contract using an associated dApp plugin/API with the ERC-721 token. The exclusivity features for that given token may differ based on the relevant smart contract the token is associated with, though some exclusivity features are relatively universal.

Examples of identifying exclusivity features include ID number (numeric count) or identifying the generation of the token as compared to the total number of generations of token. Generations in this context refer to how close the token is to originally minted tokens of the same smart contract. Generations are cycles or series of minting of tokens in a given smart contract. Typically, earlier generation tokens are considered more exclusive. Further traceable features include a number of times a given token has changed hands, a value of each exchange of that token in cryptocurrency or fiat, and rarity of visual features included with the token.

Rarity of visual features on a token varies on a smart contract by smart contract basis. In some cases, there is an algorithmic rarity of features dictated in the smart contract. In such cases, the rarity of visual features is a static lookup. In some cases, the rarity of a given visual feature or combination of visual features is determined via a survey of existing NFTs associated with a given contract. With respect to a cryptokitty, a rare color is "cloud white" coloring. In each case, a model evaluates these features and weights each and generating a respective weight across a given set of input for the user.

A type of model that has advantages over reviewing potentially dissimilar data types is a few-shot model. Initially the few-shot model is trained using various data that users associate with themselves. Examples include are social networking profiles, art, videos, audio recordings, virtual environments, ERC-721 tokens and associated protocols and dApps, and publicly posted Internet discourse. Training data typically refers to an enormous number of examples, such as hundreds of thousands or millions of examples. After being trained, the user specific parameters act as a few-shot. Each of the user input items need not be of a similar type, and the model will attempt to fit the received input into categories the model has been trained with. Each of the input parameters potentially has very little in common with respect to data types.

The few-shot model is designed to identify and extract particular media features in the few-shot (the user's specific parameters). A follow up model then identifies which features to use and what to do with those features. For example, a graphic feature of one element of user specific input may include a hat, while yet another graphic feature of a different element of user specific input may include a head. The model is trained that hats go on heads and that the graphic feature of a hat from one element may be transposed onto the graphic feature of the other element including a head.

Based on configurations of the model the resulting digital object may vary. One example of a resulting digital object is an ERC-721 token that includes a visual component. In some embodiments, the visual component takes exclusivity elements from the user's input and integrates those components into a single visual representation. A given example is a single image of a mashup of initial input. Another example is a 3D virtual environment that includes a set of trophies resembling the initial input. A third example is a written poem that rhymes various elements of the initial input. The digital object need not be an NFT. Rather, a digital object refers to a set of data that describes a discrete output in a digital format.

In step 406, a given user submits their user specific parameters to the digital object generator. In step 408, the model executes utilizing the user specific parameters and generals a user specific, unique, digital object. In some embodiments, the generation of the object is embodied by the minting of an ERC-721 token. In step 410, where there are additional users, the process repeats from step 406.

Figure 5:
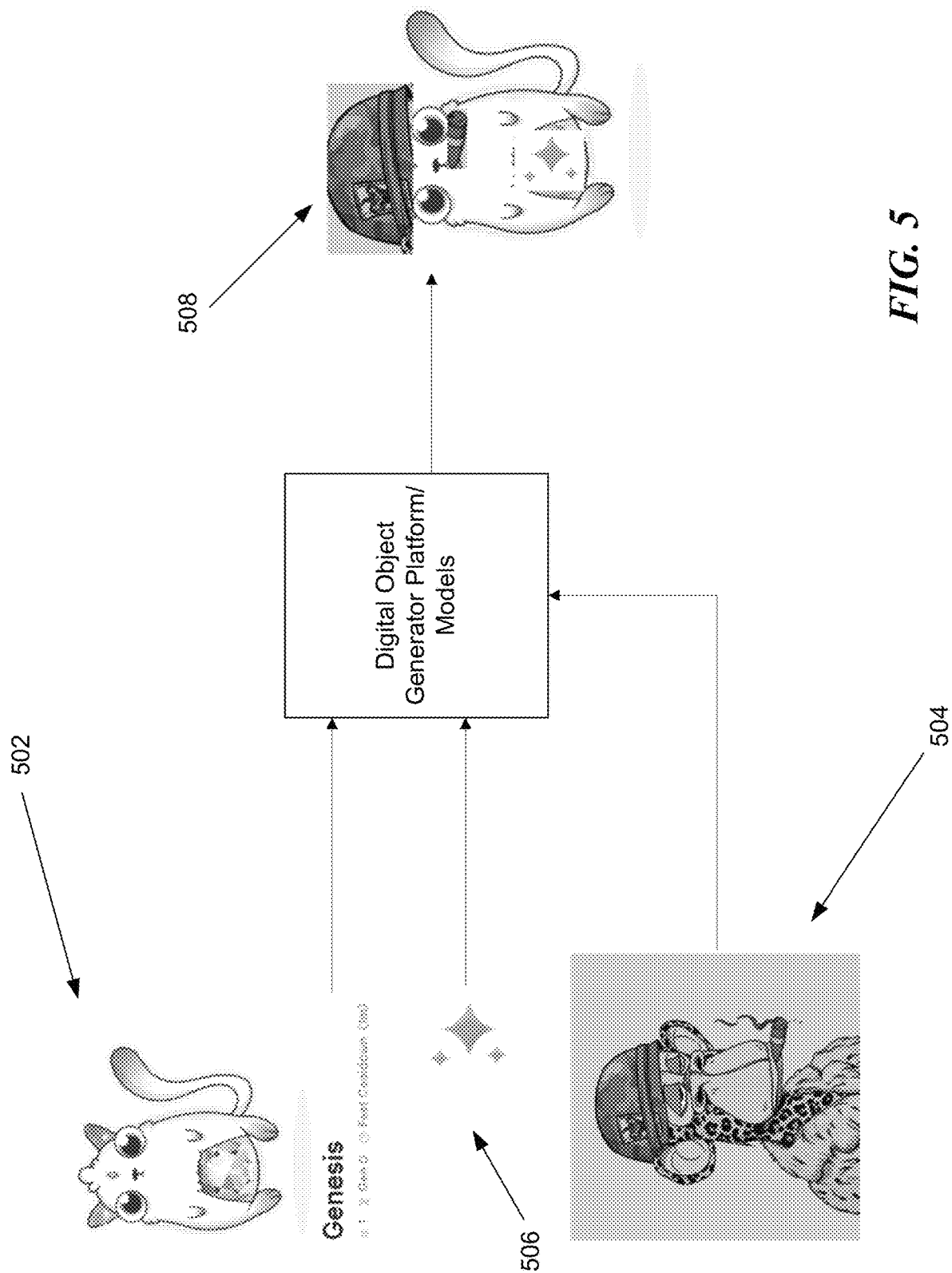
FIG. 5 is an illustration of a new digital object generated from a set of user input.

FIG. 5 is an illustration of a new digital object generated from a set of user input. The illustration includes three visual representations of existing NFTs, Specifically, a cryptokitty input 502, a Bored Ape input 504, and a Yat input 506 as provided as examples of initial user input. Each of the NFT's is further connection to a cryptographic record on a dApp, and the visual representation is interpreted by the respective dApp. A new digital object 508 is depicted that incorporates elements of the visual representation of each. In this illustrative example of the new digital object 508, the cryptokitty graphic of the cryptokitty input 502 appears with a hat and cigar graphic from the bored ape input 504, and the emoji of the Yat input 506 positioned on the belly of the cryptokitty graphic.

FSL embodiments applied to this particular set of input identifies each graphic feature of the user input. The cryptokitty input 502 is a cartoon cat, the cat has a head, a mouth, and a clearly delineated stomach area (among other body parts). The bored ape input 504 is a cartoon of an ape wearing a hat and smoking a cigar. The Yat input 506 is an emoji graphic.

Given the extracted features a model trained to select and combine the features that fit with one another matches a hat to a head a mouth to a cigar and an emoji graphic to an open space to position a graphic (e.g., well-defined stomach area).

The resulting digital object is the result of a one-way function. In the depicted example, one cannot, for instance, identify all of the details of the bored ape input 504, but may be able to identify that the original input included a bored ape based on the art style.

Figure 6:
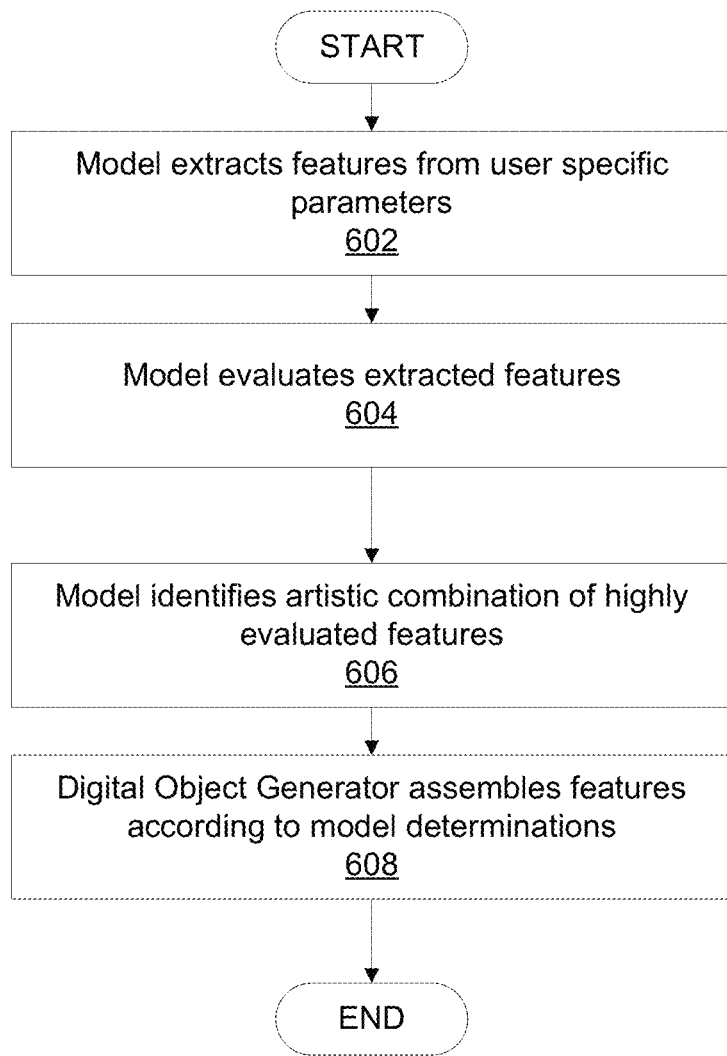
FIG. 6 is a flowchart illustrating model operation step of a unique procedurally generated object via user specific parameters.

FIG. 6 is a flowchart illustrating model operation step of a unique procedurally generated object via user specific parameters. In step 602, a set of user specific parameters are received by a feature extraction model. An embodiment of the feature extraction model is a few-shot model. The term "feature" refers to graphic features, audio features, cryptographic protocol features, video features, spatial virtual features, textual features, and/or social media features.

In step 604, extracted features are indicated to a feature evaluation model. The feature evaluation model identifies which of the extracted features to use in generation of the digital object. The model chooses features based on distinctiveness (e.g., how different they are from other available features), interoperability (e.g., how functionally a given feature can mix with another feature), and/or exclusivity (e.g., the rarity of a given feature).

In step 606, the chosen features are amalgamated by an artistic model. In some embodiments the artistic model and the feature evaluation model generate a result together. The artistic model is trained regarding what features go together. In some cases, "going together" is defined in the model semantically. That is to say, for example, that hats go on heads. That is a semantic connection between objects. However, some embodiments of the artistic model define "going together" as graphic matches between contours, colors, shadings, or other visual elements. For example, one curved element is a near match to another curved element, so one of those elements may overlay on another using curve matching. Similar to graphic matching, auditory matching may combine audio clips at a point where a similar note series occurs.

In step 608, once the elements are extracted, evaluated and combined, the digital object generator prints/mints the new digital object.

Time/Location-Based Modification of Digital Objects

User parameters have thus far been defined as something that solely a given user provides. However, in some embodiments, parameters used by the digital object generator are circumstantial to the minting request. Examples include a current generation/minting series of digital objects being generated, the serial numbers of the digital objects being minted, the timestamp the digital object is being minted at, or current events around the time of minting (e.g., The Superbowl, a concert, a convention, etc.). Location is identified as a device location of a user device requesting generation/minting of the digital object as associated with addresses, buildings, or events. Device location is determined via GPS data and/or wireless network triangulation. The location data is associated with the physical area by overlaying the location data on a mapping program that includes metadata of buildings and/or events at the physical area of the location data.

In some embodiments, the time/location-based modification is used as a salt or a randomization element to a given input set. In some embodiments, the time/location-based modification element is identifiable from the resulting digital object is (e.g., while the function is one-way, at least the time-based input feature is fully identifiable). Time/location-based input features enable an additional means of variation, distinction, and social features.

Figure 7:
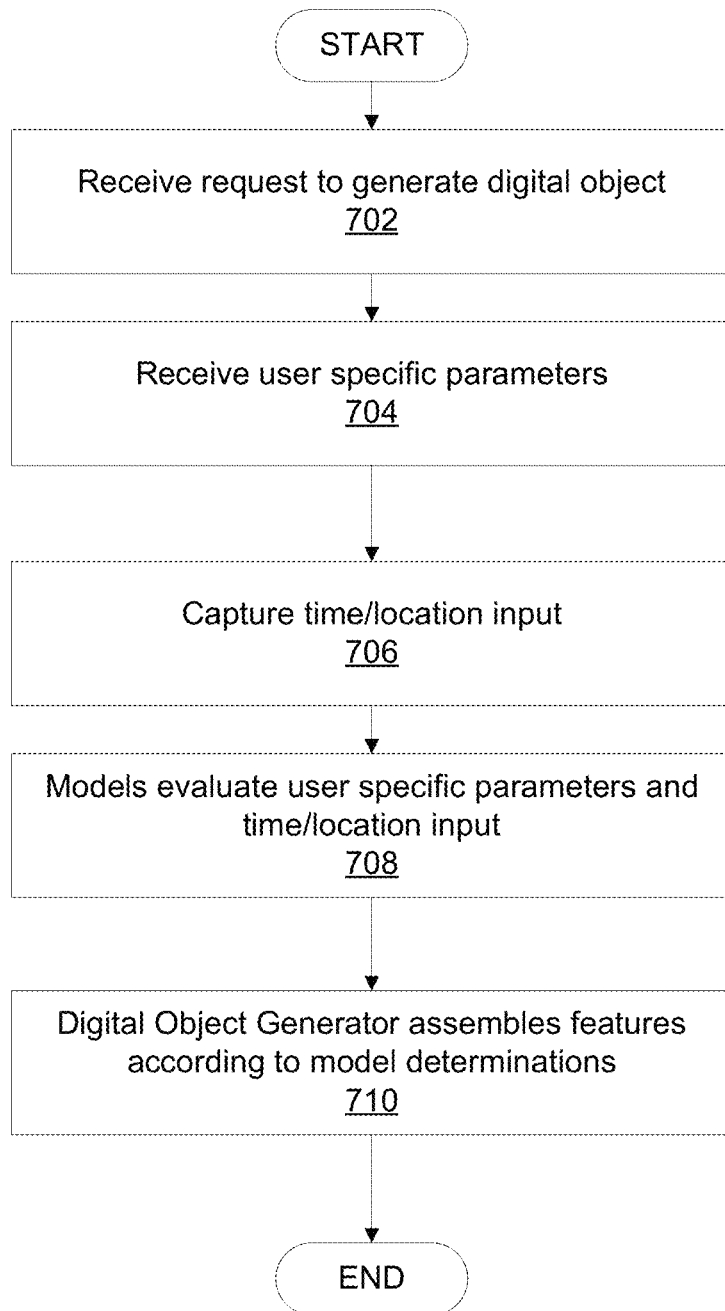
FIG. 7 is a flowchart illustrating implementation of time-based input to digital object generation.

FIG. 7 is a flowchart illustrating implementation of time-based input to digital object generation. In step 702, the digital object generator receives a request to mint a new digital object. In step 704, user specific parameters are received by the digital object generator. In step 706, one or more of a time element and/or a location element is captured based on any of the present time, the minting status of digital objects, and/or where the request of step 702 was made from.

In step 708, the models responsible for digital object generation evaluate the user specific parameters and the time/location element giving high weight to the time/location element. In step 710, the digital object generator mints a digital object including the time/location element.

Blockchain Tracing of Digital Objects

Like Emoji sequences as described above, embodiments of the digital objects are encodable to a distributed consensus network such as a blockchain. An example blockchain is the Ethereum blockchain, via ERC-721 tokens. Whereas emoji sequences have a finite number of potential characters, the digital objects described herein do not. A theoretical encoding scheme is unable to scale indefinitely to match the number of characters/elements/formats that embody a given digital object.

A means to limit the number of variables to represent in a given digital object is to limit the number of digital objects in any given series or generation (e.g., 1000 digital objects). Where a series or generation is encoded to a portion of a cryptographic token, encoding may be refreshed and reused in subsequent series. For example, a first data unit (e.g., a byte) is used to identify the generation of the digital object whereas subsequent data units are used to encode the visual features of the digital object. The same encoding is subsequently used in a different generation to refer to a different visual feature.

Figure 8:
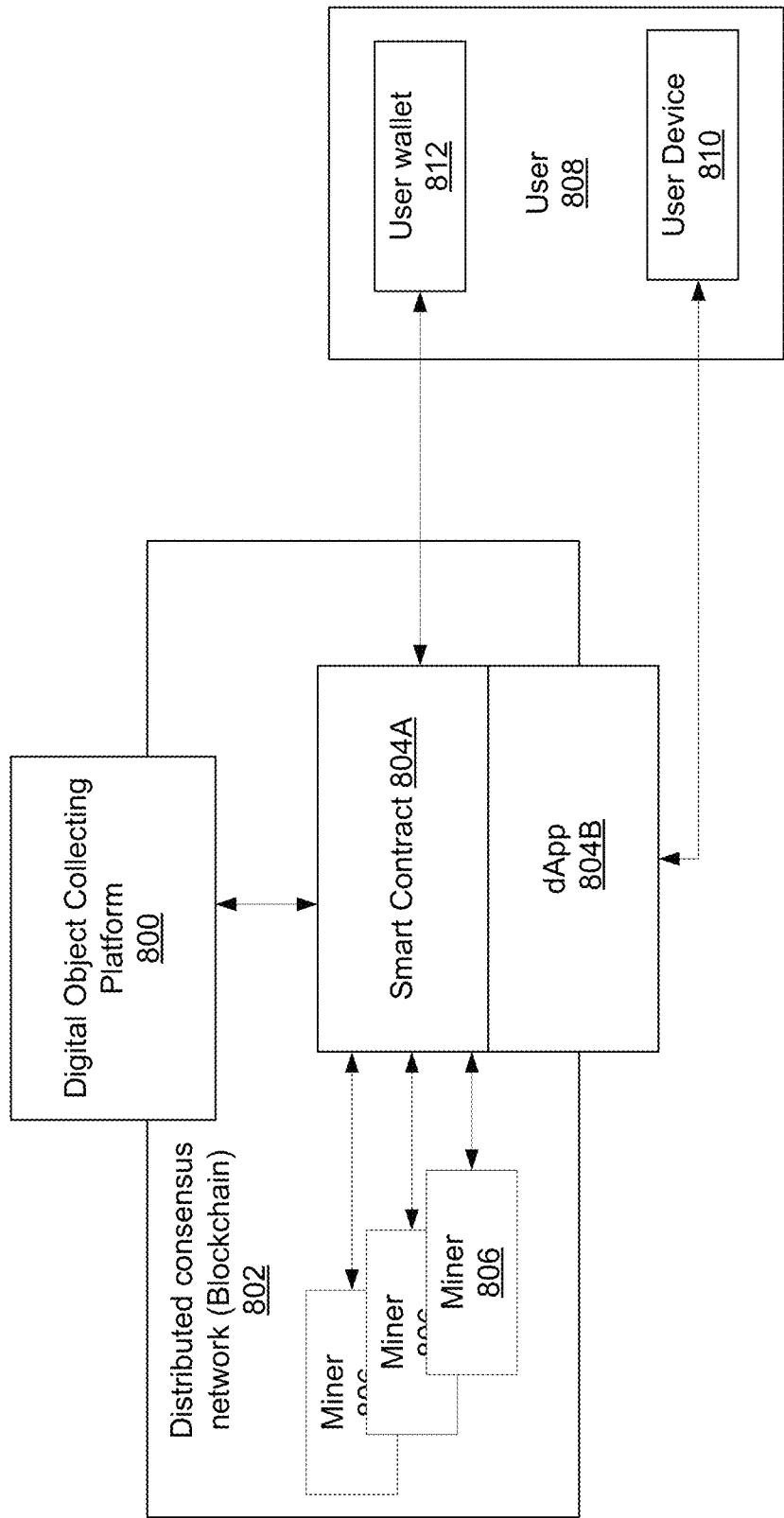
FIG. 8 is a diagram illustrating a connection between digital objects and a distributed consensus network supported by a blockchain data structure.

Generational divisions are also effectuated through event-based minting of digital objects. FIG. 8 is a diagram illustrating a connection between digital objects and a distributed consensus network supported by a blockchain data structure. A digital object creation platform 800 interfaces with a blockchain 802 via a dApp/smart contract 804A/B. The smart contract 804B is executed by miners 806.

When a user 808 requests minting of a new digital object via the dApp 804A, the dApp makes calls to other dApps connected with the user device 810 in order to identify other NFTs that the user has possession of via the other dApps. Embodiments of triggers to call other dApps include identifying other dApp software on the device 810 making the request to mint the new digital object, checking a list of popular dApps, and/or enabling the user to identify/flag (e.g., via GUI) which dApps they wish to flag for inspection for purposes of generating the new digital object.

In some embodiments, the dApp 804A ensures possession of the other NFTs used as input in the same user wallet 812 as the user wallet 812 associated with the initial request to generate the digital object. In this way, users are forced to actually own the NFTs that they are supplying as input for the generation of the digital object.

The check identifies the public key that is associated with both the requestor 808, and all of the user specific parameter/input. By nature of public keys being public information, no secret information need be shared with the dApp 804A.

Once minted, the dApp 804A delivers the new digital object as a cryptographic token/NFT to the cryptographic wallet 812 associated with the requesting user 808 via the smart contract 804A.

Figure 9:
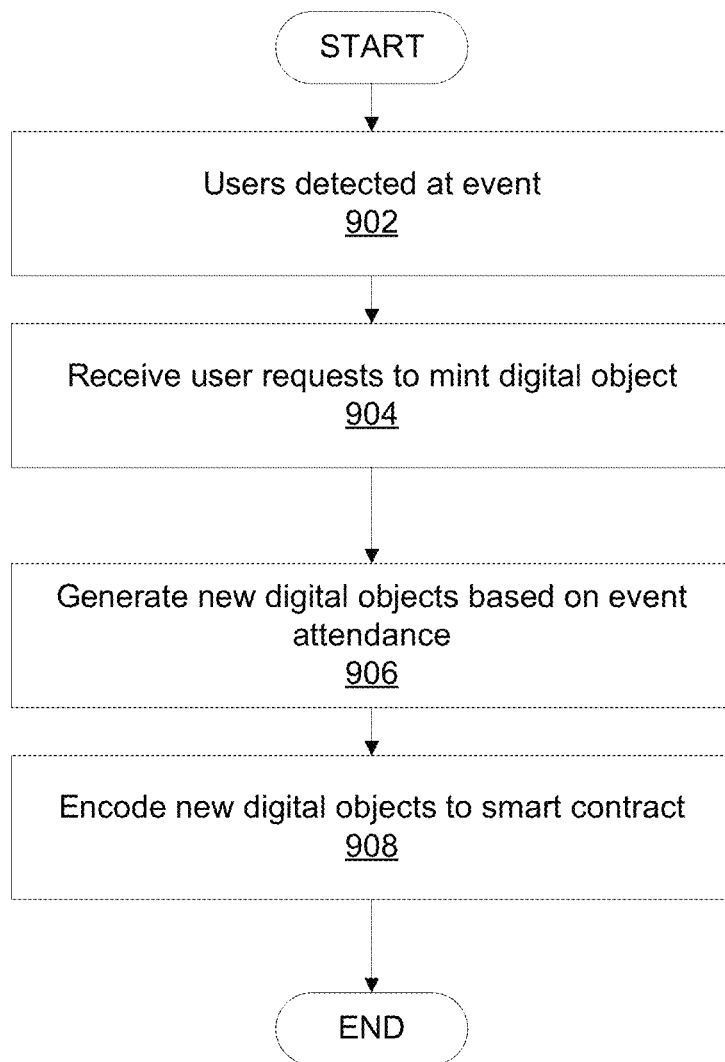
FIG. 9 is a flowchart illustrating event driven generation of digital objects.

FIG. 9 is a flowchart illustrating event driven generation of digital objects. Event driven digital objects aid in limiting the number of digital objects in a series or generation such that only digital objects that were generated during or at a given event exist, thereby limiting the total number. Limiting the total number serves both exclusivity of the digital objects and simplicity of coding the objects. Fewer digital objects mean fewer total variations across the entire set of digital objects and thus less data is required to represent the visual assets associated therewith.

In step 902, a set of users attend an event. Verification of attendance occurs in one or more of user device location data, ticket data, guest list data, user activity on a predetermined web host, and/or ownership of an NFT connected to event admittance (e.g., convention, gala, sporting event, etc. . . . ). In step 904, during the event an attending user requests to mint a new digital object. In step 906, the digital object generation platform generates a digital object based on the event. In step 908, the non-cryptographic, user decipherable representation of the digital object is encoded to the smart contract using assets that are linked to the event.

Digital Object Social Networking Communities

Embodiments of social networks connect users based on possession of digital objects. A social network is a computing construct that connects users in a graph data structure including social features.

Figure 10:
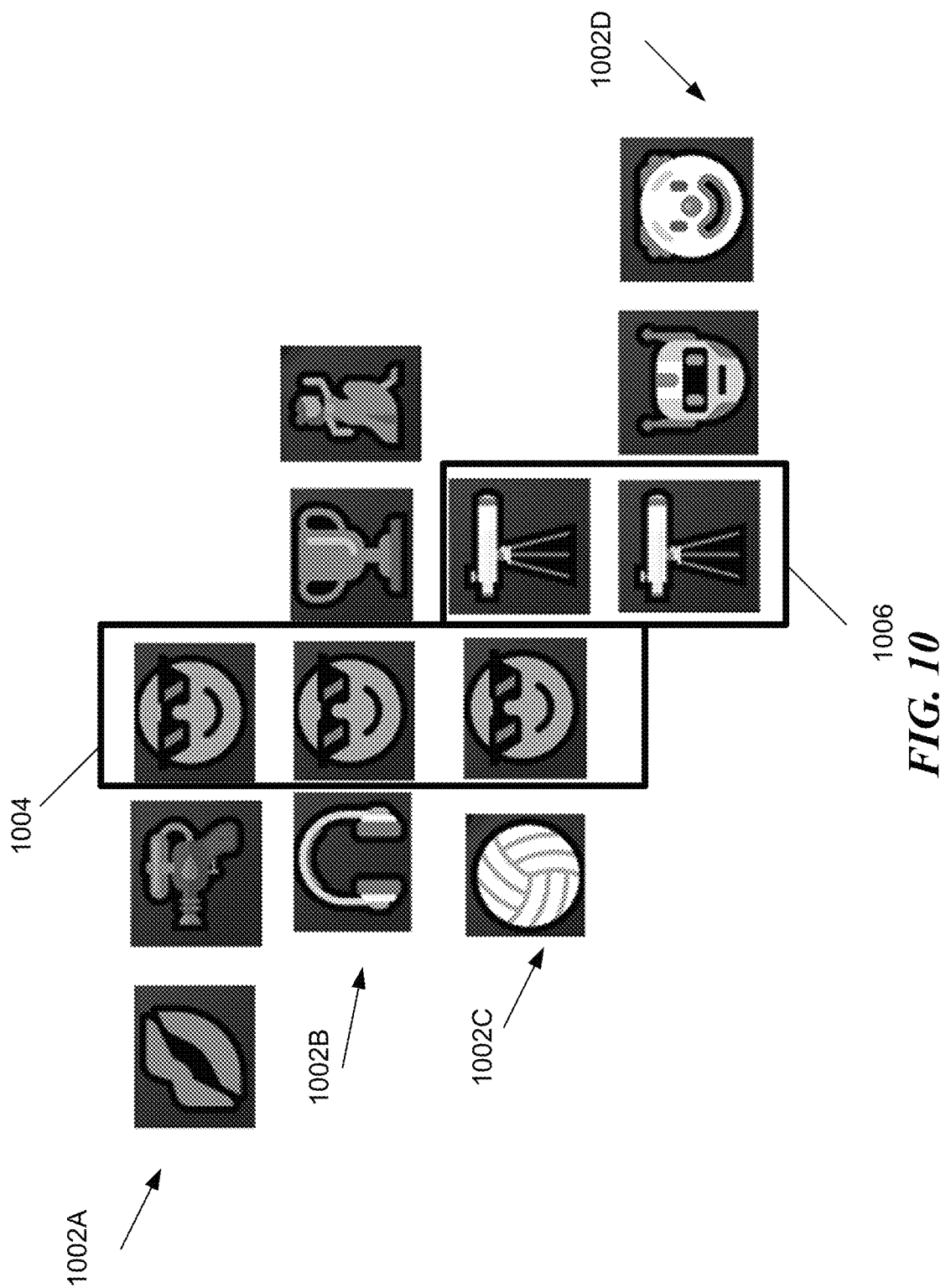
FIG. 10 illustrates a number of emoji sequences that are connected via social networking features based on the features included in each emoji sequence.

FIG. 10 illustrates a number of emoji sequences that are connected via social networking features based on the features included in each emoji sequence. Emoji sequences such as those under marketed as Yats include order specific sequences of emojis that are selected by their respective users. Users select particular sequences of emoji for any number of reasons, though some do so out of an affinity to a given emoji or series of emojis. Some users further use the sequence of emojis to tell a narrative.

Emoji sequences 1002A-D are arranged to align commonality between each sequence vertically. A sample social network for a user having possession of the emoji sequence 1002C is portrayed. Specially, the user in possession of sequence 1002C is connected 1004 to users in possession of 1002A and 1002B by virtue of sharing a sunglasses smiley emoji in each respective emoji sequence. In some embodiments (not pictured), social connections are limited to those emoji sequences that position matching emojis in matching sequence locations.

Emoji sequence 1002C and 1002D are further socially connected 1006 based on similar inclusion of the telescope emoji. In some embodiments a degrees of connection analysis (e.g., "6 degrees") is performed to further connect users associated with emoji sequences. For example, the user associated with emoji sequence 1002A is connected via one degree away from emoji sequence 1002D, via the social connection to 1002C. In some embodiments social features between connected users enable shared newsfeeds, message delivery, and/or interactive games.

While the example depicted in the figure pertains to social connections via emoji sequences, similar social connections are established between digital object owners. For example, digital object owners that have respective digital objects that similarly made use of a give type of ERC-721 token are linked in the same way users with matching emoji use are linked (e.g., users that have a Yat, or users that have a cryptokitty, etc.).

Social media users frequently craft an image or identity around their profiles. However, existing social media profiles are static based on a given set of settings or preferences. That is, changes to a social media profile are preconfigured or require active participation by the user to make changes to their profile. Embodiments of the unique digital object disclosed herein are implemented as "profile pictures" or otherwise customizable social media expressiveness. IN some embodiments, a novel profile picture cycles through a set of user submitted input. An example of such a profile picture cycles through visual representations of cryptographic tokens linked to a cryptographic wallet they control.

Some embodiments of the profile picture unique digital objects make use of 3D shapes such as polygons or spheres.

Figure 11:
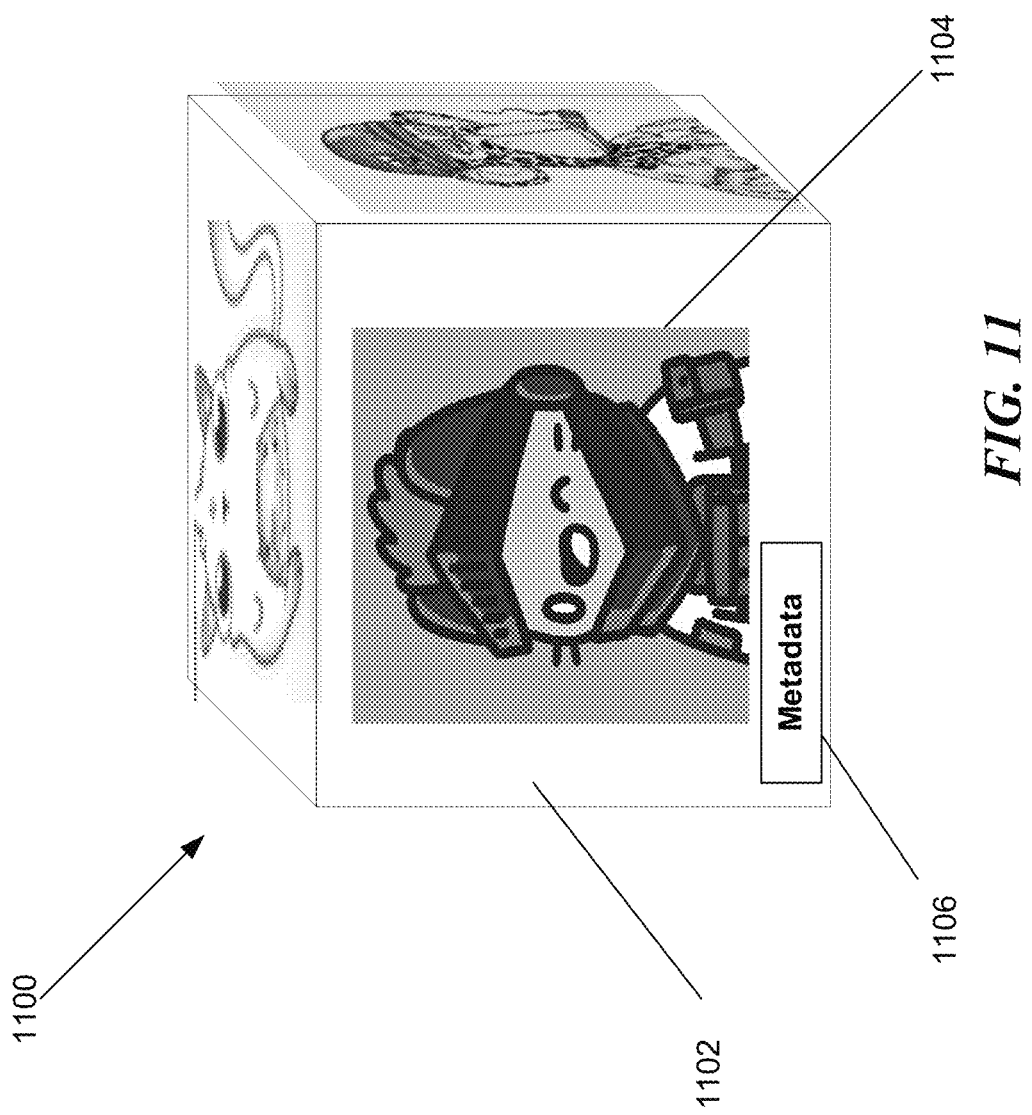
FIG. 11 is an illustration of a 3D graphic object.

FIG. 11 is an illustration of a 3D graphic object 1100. An embodiment of a 3D graphic object 1100 is a 3D polygon including six faces (e.g., a cube) that displays user supplied input/content. An implementation of a social media profile making use of the 3D graphic object 1100 presents the 3D polygon on the social media profile in place of a profile picture or other element of the social media profile. The cube revolves (e.g., following a random or preconfigured path through faces) and/or may be dragged into a given position by a user. The preprogrammed path follows a user selected order, or a preconfigured setting (e.g., display faces as chronologically added, display faces with fewer impressions first, etc. . . . ).

In some embodiments, user interaction with the 3D graphic object 1100 in predetermined ways is logged in the social networking platform. For example, spinning, clicking, dragging, or swatting the 3D graphic object 1100 is recorded as social interactions including options such as: "like", "dislike," "follow," "friend request," "post," etc. . . .

The 3D polygon enables some liquidity to a user's self-selected persona/profile picture. Multiple images or avatars 1104 exist simultaneously for that user as each is represented on a face 1102 of the 3D polygon. The number of images/avatars 1104 are not limited by the number of faces on the polygon—rather, in some embodiments, faces rotate. For example, where the 3D graphic object 1100 is presented in a 2D plane, a face 1102 that is currently out of view or opposite a front face is modified to present a different image/avatar 1104. The digital object described herein may be implemented as an identity digital object.

The Figure depicts use of a polygon (cube) with sides or faces 1102; however, spherical embodiments make use of surface regions instead of strict faces 1102. Surface regions occupy some predetermined portion of the surface of the sphere and acts similarly as a face. In some embodiments, the sphere is depicted as a globe, and the regions are depicted as "landmasses/continents" found thereon.

In some embodiments, the images/avatars 1104 implemented by the 3D graphic object 1100 are representations of cryptographic tokens (visual or otherwise). In these embodiments, there is further data or metadata 1106 that is associated with the cryptographic token. Examples of the metadata 1106 associated with a cryptographic token includes a smart contract or dApp that the token is connected to, the period of time the given user has held the token with their cryptographic wallet, the number of times the token has changed wallets, a list of prior users who held the token, a generation of the token, a serial number of the token, and/or a name of the token. The metadata 1106 is displayed by the 3D graphic object 1100. Some embodiments display the metadata on a forward-facing face 1102 of the 3D graphic object 1100.

Some social networking platforms make use of the metadata 1106 (even if not actively displayed) for tracking, analytics, impression data, advertisement placement, and matching purposes.

The 3D graphic object 1100 inserts directly into social media profiles where profile pictures or avatars traditionally are placed. In some embodiments, the 3D graphic object is given a more prominent position on the user interface of the social network, specifically taking up a greater portion of the page/window. Still other embodiments make use of the 3D graphic object in an extended reality (XR) setting. For example, is a digital or digitally augmented environment, the 3D graphic object 1100 follows the user or an avatar of the user around (e.g., as a pet or companion).

Figure 12:
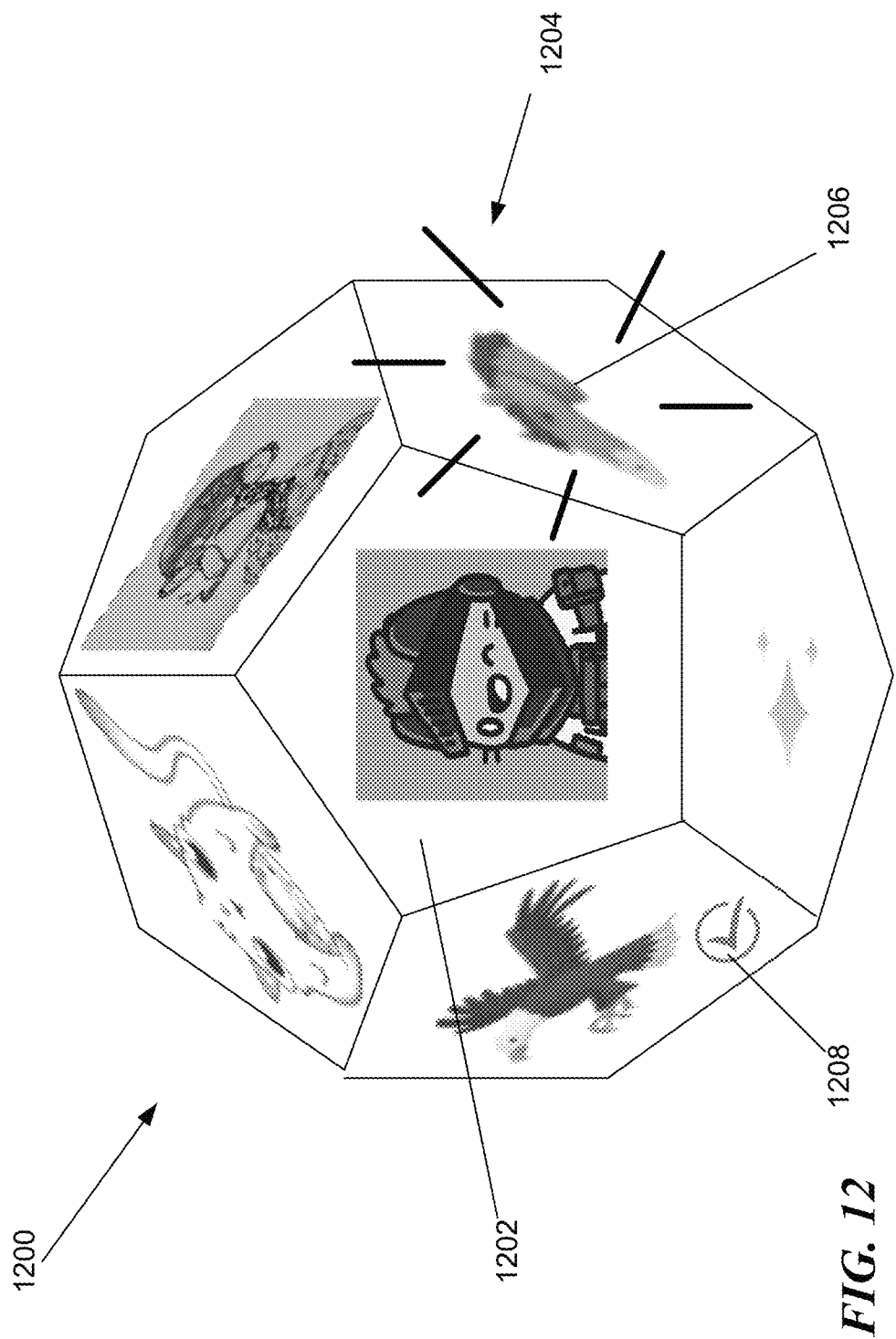
FIG. 12 is an illustration of a first set of additional features of a 3D graphic object.

FIG. 12 is an illustration of a first set of additional features of a 3D graphic object 1200. Where the polygon depicted in FIG. 11 is a cube, FIG. 12 depicts a dodecahedron. Various embodiments employ different numbers of faces 1202, fewer and greater. Various embodiments expand and contract faces 1202 based on user and/or platform settings.

In some embodiments, the 3D graphic object 1200 includes additional focus or highlighting 1204 on certain elements 1206 based on user and/or platform settings. For example, where a given element 1206 is newly included in the 3D graphic object 1200, a highlight glow 1204 is added to the appearance of the given element 1206 to alert users to the presence of the new element 1206. In another example, the highlight glow 1204 is applied to an element 1206 as chosen by the user.

In some embodiments, elements 1206 displayed by the 3D graphic object 1200 are verified 1208. Where a given element 1206 is a representation of a cryptographic token verification may be performed on the token to authenticate the token as being representative of an intended token. Token representations are digital data that can be copied and reproduced. Those representations may be subsequently linked to tokens that are not connected to a platform from which the representation originated. Therefore, a verification performed to ensure that the representation that appears on the 3D graphic object 1200 is linked to a cryptographic token that is connected to a smart contract or dApp consistent with the representation. For example, a cryptokitty graphic may be re-minted onto a cryptographic token that is unconnected to the cryptokitties dApp. Verification markings certify that the cryptokitty representation on the 3D graphic object 1200 is connected to a cryptographic token on the cryptokitties dApp/smart contract.

Verification is performed by human verification (e.g., a comparison of the token representation to the underlying token that the representation is drawn from), heuristic analysis (e.g., comparing known art styles of the representation to expected dApp's drawn from a popular list), or via a machine learning model that was trained on identification of token representations.

Figure 13:
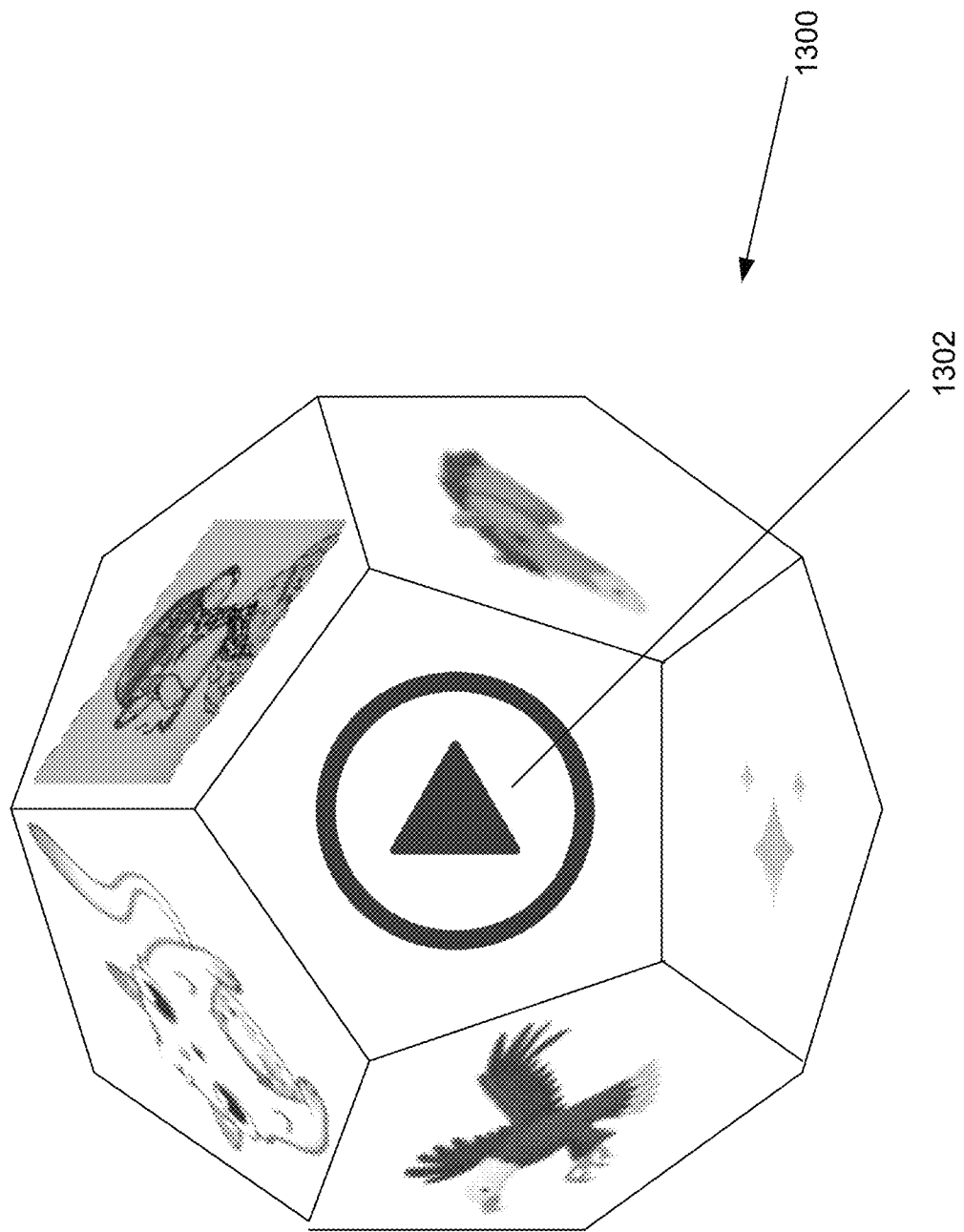
FIG. 13 is an illustration of a second set of additional features of a 3D graphic object.

FIG. 13 is an illustration of a second set of additional features of a 3D graphic object 1300. Not all elements 1302 included on a 3D graphic object 1300 need be images. Other examples include audio data, video data, or multimedia data. As depicted in the figure, a play button appears that users may interact with. Activating the play button triggers the underlying multimedia element 1302 to play.

Figure 14:
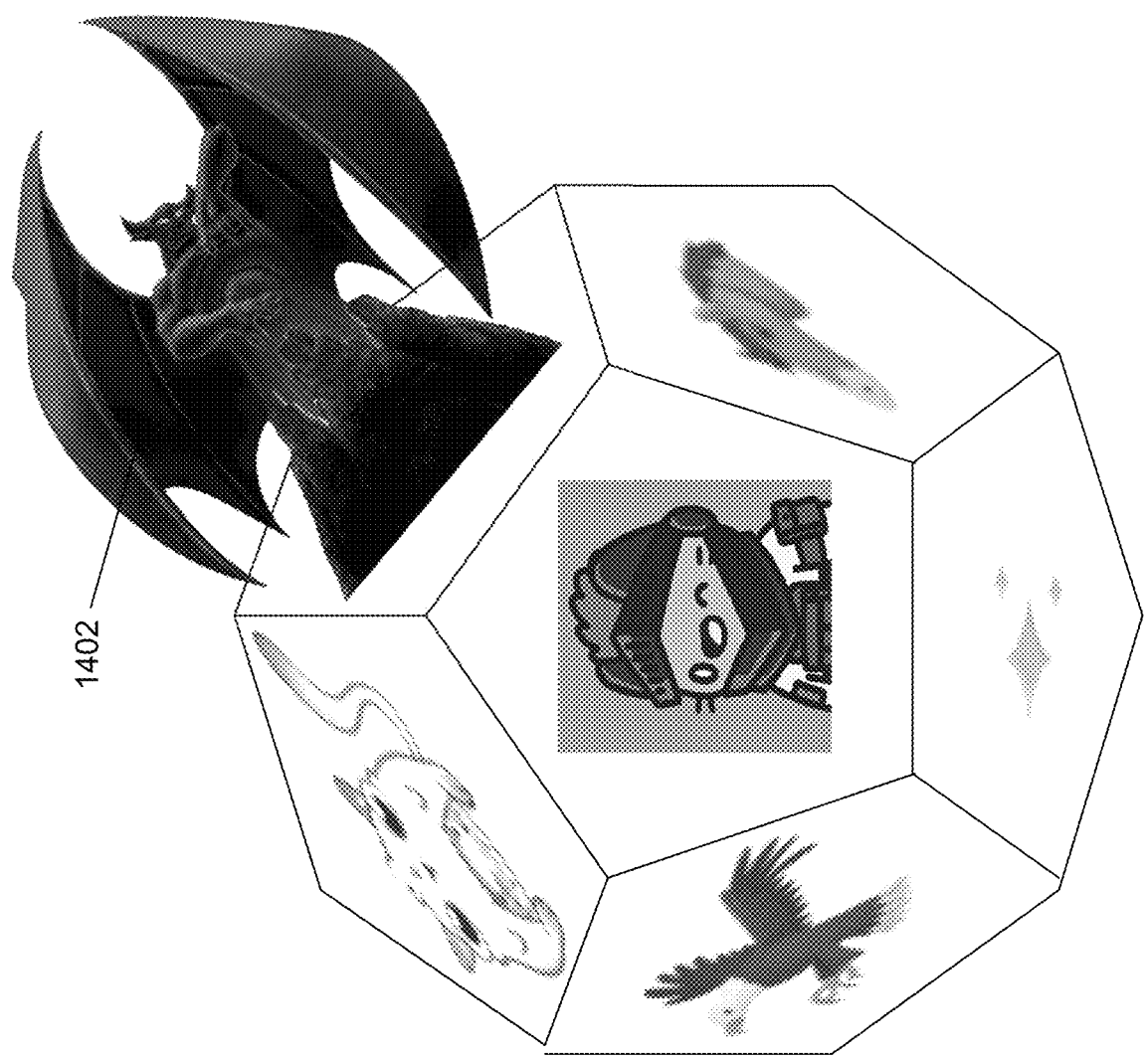
FIG. 14 is an illustration of a third set of additional features of a 3D graphic object.

FIG. 14 is an illustration of a third set of additional features of a 3D graphic object 1400. Not all elements 1402 included on a 3D graphic object 1400 need be represented in 2D. Examples include 3D renderings that extend out or inward from the 3D graphic object 1400. As depicted in the figure, an animated character appears bursting from the 3D graphic object 1400.

Figure 15:
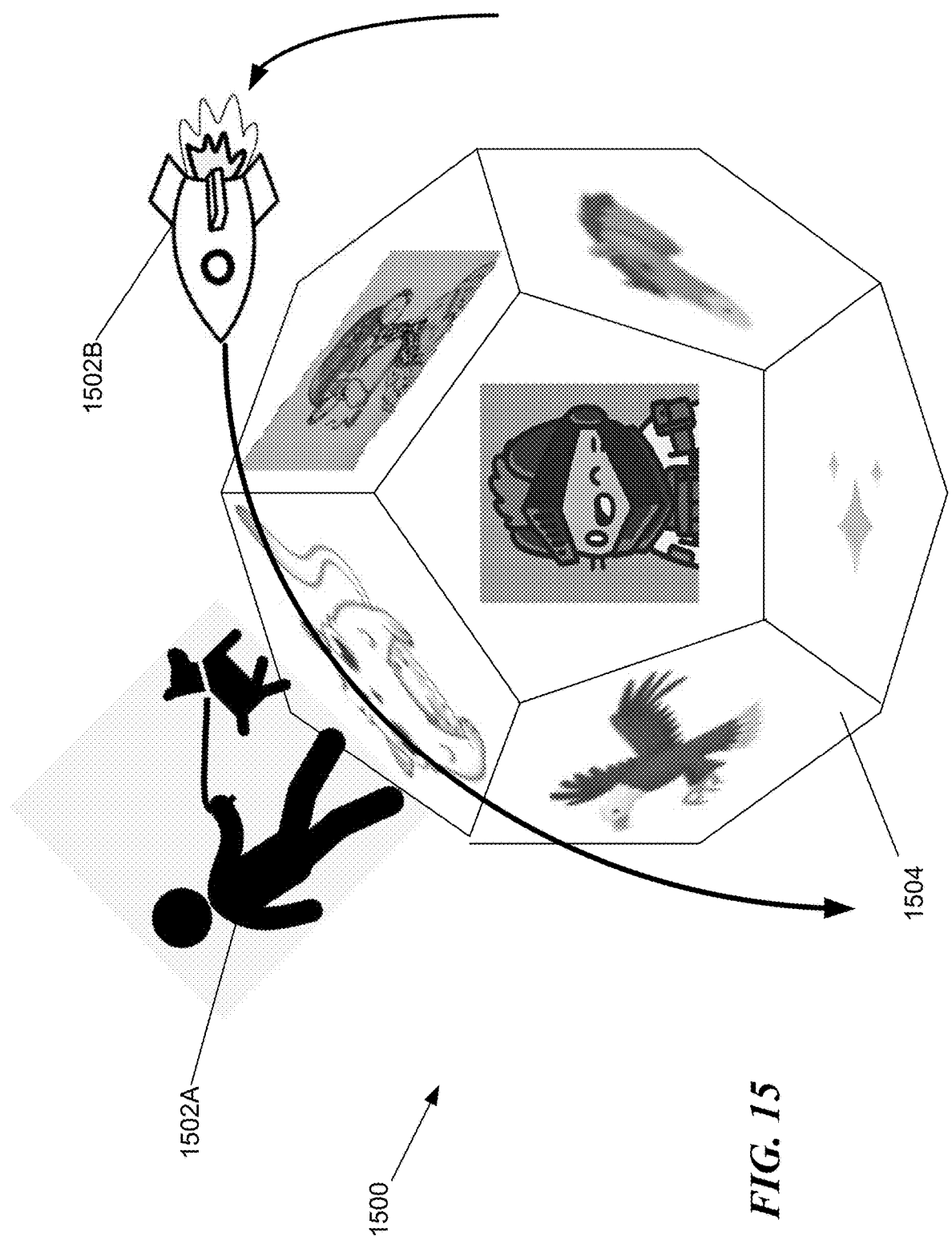
FIG. 15 is an illustration of a fourth set of additional features of a 3D graphic object.

FIG. 15 is an illustration of a fourth set of additional features of a 3D graphic object 1500. Not all elements 1502 associated with a 3D graphic object 1400 need be locked to the surface or face 1504 of the 3D graphic object 1500. Embodiments include orbiting elements 1502. The orbiting elements 1502 track around the 3D graphic object 1500. As depicted in the figure, an animated character 1502A appears to be walking a dog around the surface of the 3D graphic object 1500. Additionally, a spaceship element 1502B orbits the 3D graphic object 1500 at a distance. The orbiting elements 1502 as positioned in slots similarly to other elements included, the slots are merely associated with a different region relative to the 3D graphic object 1500 than those positioned on the faces 1504.

FIGS. 11 through 15 depict various features of various embodiments of 3D graphic objects. The figures are intended as illustrative examples and not to be construed as limiting combinations of features. The features are interchangeable, and embodiments include each combination thereof. Input used for the 3D graphic object may include any of the described user specified parameters described herein and/or pre-generated elements.

Figure 16:
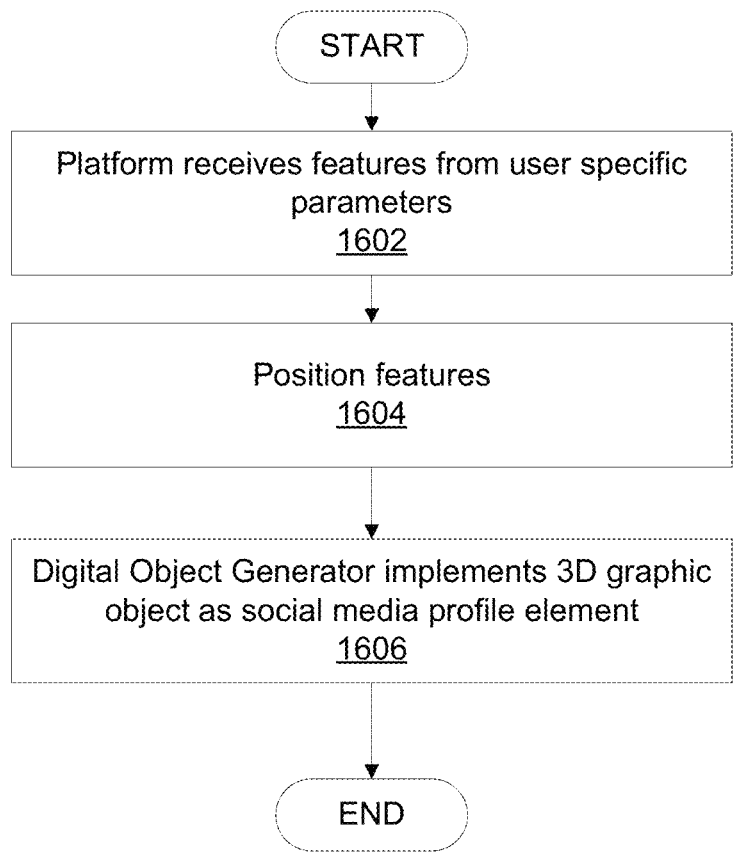
FIG. 16 is a flowchart illustrating a user interface applied to a 3D graphic object.

FIG. 16 is a flowchart illustrating a user interface applied to a 3D graphic object. In step 1602, a set of user specific parameters are received by an object generator. The user specific parameters are employed as elements in the 3D graphic object. User specific parameters refers to graphic representations, audio representations, cryptographic protocol representations, video representations, spatial virtual representations, textual representations, and/or social media representations.

In step 1604, the platform receives input regarding positioning and implementation of the user submitted parameters. The user is enabled to design the appearance of the 3D graphic object based on the user submitted parameters used as elements and the configuration of those elements.

In step 1606, the chosen features are amalgamated according to the configuration and the 3D graphic object is inserted into a social media profile of the user. In some embodiments the 3D graphic model is minted as an NFT. The minted version of the 3D graphic object may be implemented in any other portion of the disclosure herein where an NFT is referenced.

The above-described process directly refers to generation of the 3D graphic object, though other processes described herein may also generate 3d graphic objects as well. Generation thereof is not limited to the process depicted in FIG. 16.

Figure 17:
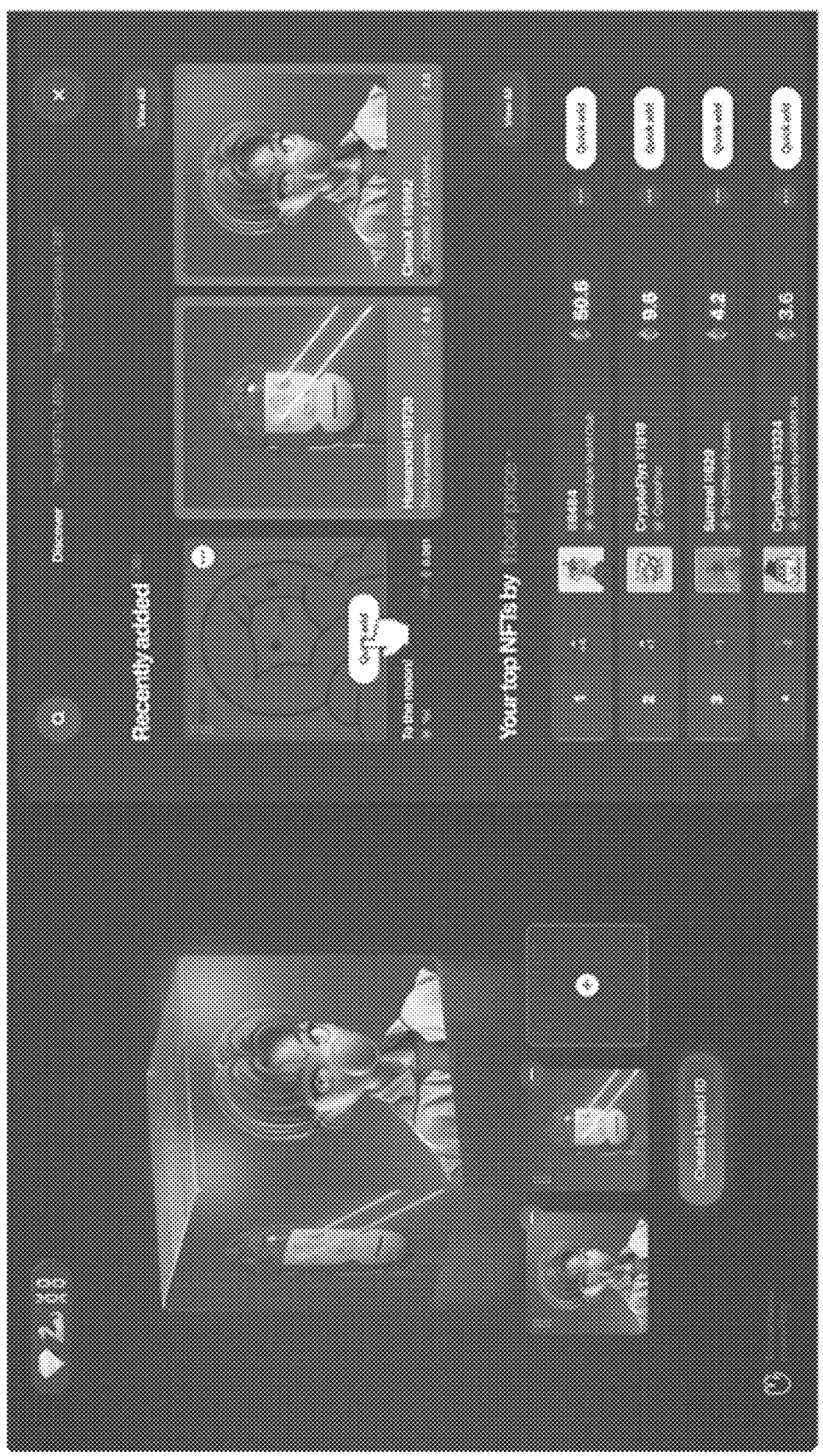
FIGS. 17 and 18 are screenshots of implementations of 3D graphic objects where a given set of media data is applied to faces of the 3D graphic object.
Figure 18:
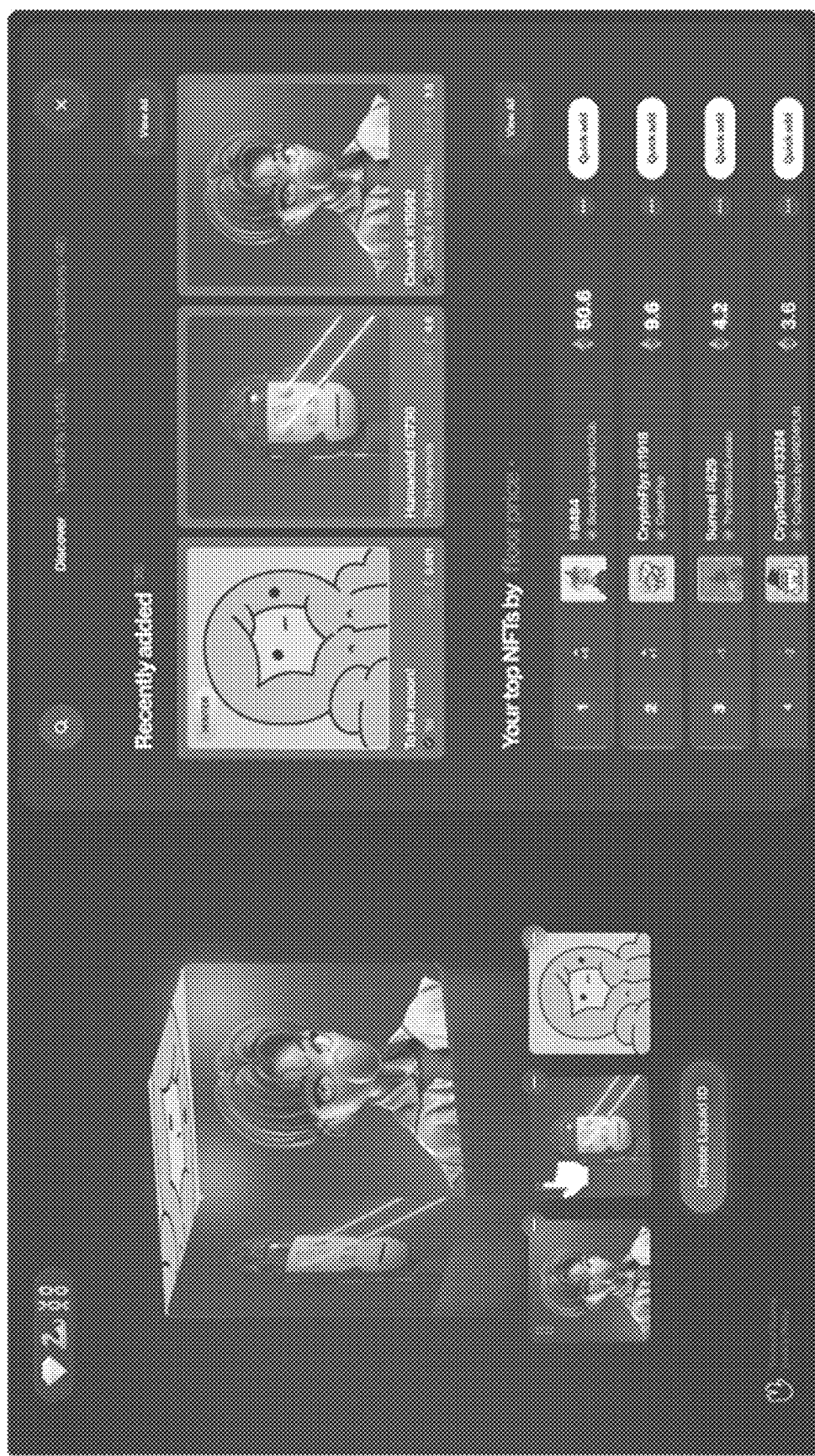

FIGS. 17 and 18 are screenshots of implementations of 3D graphic objects where a given set of media data is applied to faces of the 3D graphic object. One of ordinary skill in the art is able to ascertain embodiment and implementation details therefrom.

Time-Based Leaderboard

The behavior of owners of NFTs is to frequently trade their digital objects and cause significant turnover of those objects. The constant turnover of digital objects is not an ideal ecosystem for administrators or artists related to those NFTs. The time-based leaderboard thus encourages users and holders of NFTs to hold their NFTs longer.

The leaderboard indicates how long a given user has held a given NFT for example from a particular collection/generation of NFTs. A collection may be defined as a particular drop, from one smart contract/dApp, or as the entirety of the NFTs within a given smart contract. In some embodiments, the time-based leaderboard is based off NFTs from a contemporaneous collection so as to compare fairly. In such circumstances, all users who have continuously held their NFTs from that collection will be tied for first.

Thus, sorting ties is an important detail for purposes of the leaderboard. In some embodiments, ties are sorted by a number of digital objects from the collection held or based on staking of digital objects. When a NFT is "staked," that NFT is transferred to a holding wallet/contract for a predetermined length of time. Staking an NFT locks that NFT from transfer by the owner. While staking of a NFT technically transfers the NFT away from the owner's wallet, for purposes of the leaderboard, the NFT is considered contiguously owned by the original user.

The leaderboard enables social benefits and loyalty rewards such as getting early or exclusive access to future distributions of NFTs and anything the creator wants to incentivize loyalty (a velocity sink) and award reputational benefits.

Identity on the leaderboard is displayed in a number of ways. Additional information provided to the leaderboard enables additional manners of representing an identity on the leaderboard. At a base level, a cryptographic address associated with a wallet that holds an NFT serves as a functional identity for users on the leaderboard. However, when available (e.g., tied to a given cryptographic address), the leaderboard is enabled to use a 3D graphic object (described above) as a rotating or cycling representation of a user's identity. Other examples of identity include social network handles, Yats, user names, and/or real names.

Figure 19:
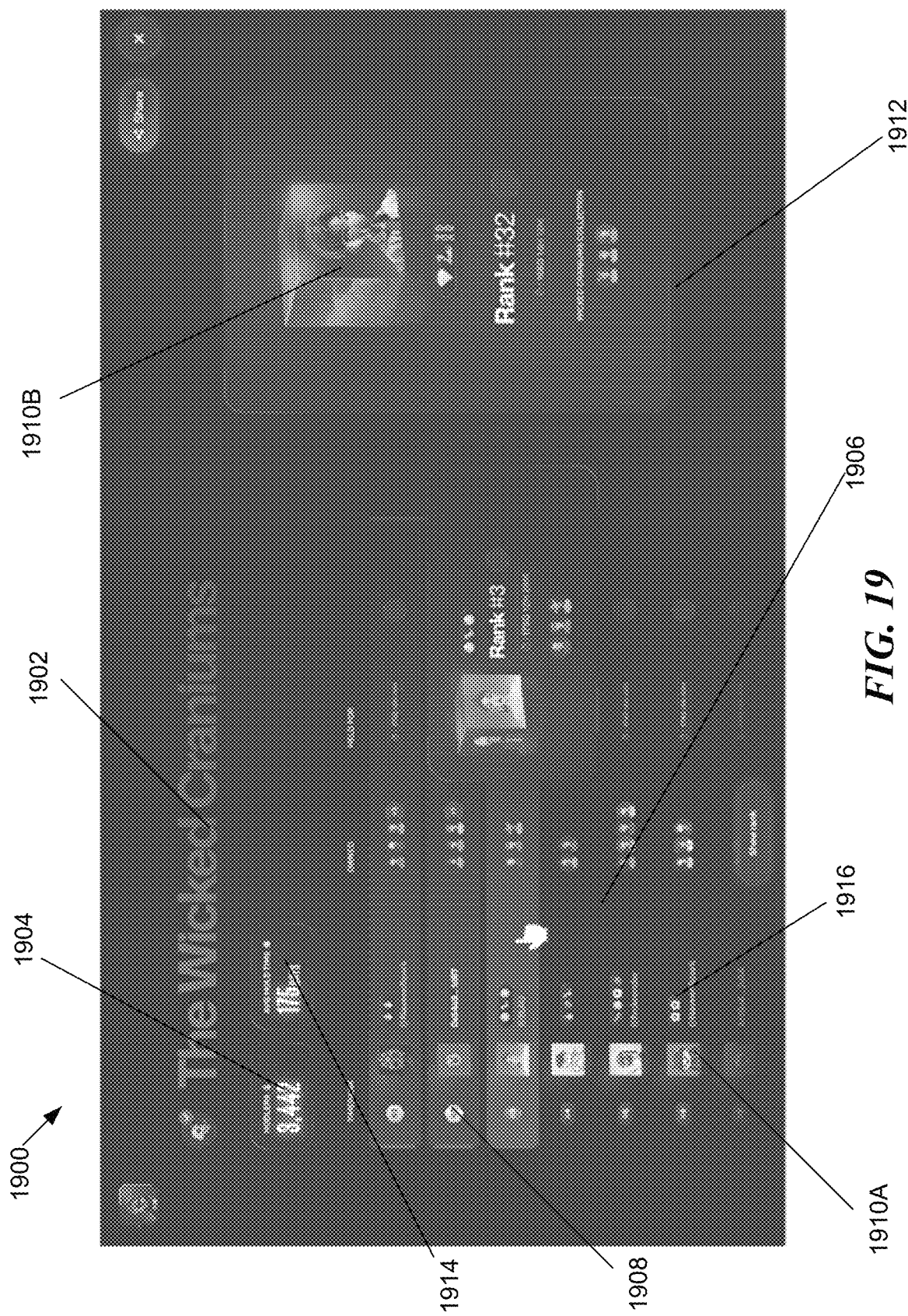
FIG. 19 is a screenshot of a time-based leaderboard interface.

FIG. 19 is a screenshot of a time-based leaderboard interface 1900. The leaderboard 1900 pertains to a particular collection 1902 of digital objects/NFTs. As depicted in the Figure, the collection 1902 is "The Wicked Craniums," a set of procedurally generated art of skeleton characters based on artist created visual assets. The leaderboard 1900 further includes a counter 1904 for the number of users who have an NFT from the collection 1902. The leaderboard 1900 is embodied by a chart of ranks 1906 which orders the users based on the contiguous length of time they have possessed an NFT from the collection 1902.

The chart of ranks 1906 displays the numerical ranks 1908 of each user and an identity 1910 for each user. In the chart of ranks 1906, the user's identity 1910 is displayed using a 2D representation 1910A of an identity digital object (described above). The media displayed by the user identity 1910A is either of a cycling/rotating media data or a predetermined "front face" of the identity digital object.

To the right side of the screen, an active user's profile 1912 is depicted. An identity digital object is further depicted in 3D 1910B, with faces each having media content as described above. The leaderboard further includes an average length of possession of NFTs 1914. Further linked to the users are Yats 1916. In this depiction, a Yat 1916 is another NFT type that is linked to the identity digital object, on a one-to-one basis. However, in some embodiments, linking of NFT types is performed on a many-to-one or many-to-many basis.

The data underlying the leaderboard is available in cryptographic records on a relevant blockchain as associated with the smart contract linked to the collection 1902. In some embodiments, while the leaderboard itself is public, the underlying data is gated behind collection controls. For example, the artist that administrations the collection 1902 has access to the underlying data in a sorted format. The underlying data is used to implement leaderboard rewards such as early or exclusive access to subsequent collections. Because access is based on connection to a valid public cryptographic address, the underlying data identifying users based on the public cryptographic addresses is useful for issuing leaderboard rewards.

Figure 20:
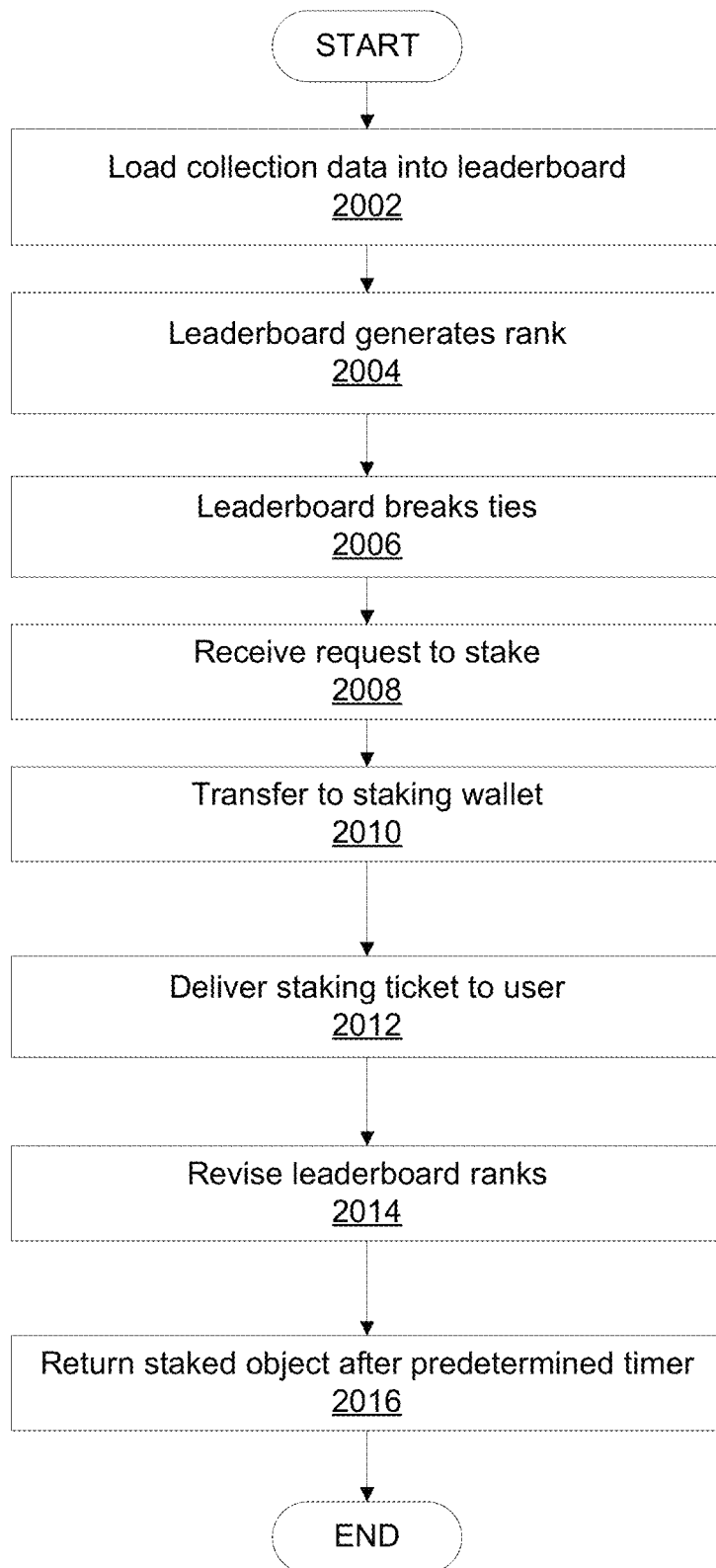
FIG. 20 is a flowchart illustrating a method of implementation of a time-based leaderboard interface.

FIG. 20 is a flowchart illustrating a method of implementation of a time-based leaderboard interface. In step 2002, a leaderboard platform loads a set of digital object collection data. In step 2004, the leaderboard platform generates a rank order based on length of possession for digital objects in the collection by user.

In step 2006, the leaderboard breaks ties. Ties are broken by number of digital objects held and/or length of object staking. In step 2008, the leaderboard platform receives a request to stake a digital object for a predetermined period of time.

In response to the request to stake the digital object, in step 2010, the digital object is transferred to a universal staking wallet where the digital object is locked and prevented from interaction for the predetermined time. Staked digital objects protocol limited digital objects that indicate a future of holding the digital object. Staking demonstrates greater than an intent to hold, as there is no way to return a staked digital object before the predetermined time expires. In some embodiments, there are separate leaderboards for length of stakes (e.g., divorced from past holding time).

In step 2012, the universal wallet provides the owner with a staking ticket digital object that tracks the staked digital object. In some embodiments the staking ticket enables return of the staked digital object to cryptographic address other than the address the digital object had been in. The staking ticket includes identity information such that the owner may be identified separate from the original cryptographic address. For example, in some embodiments, the staking ticket includes encrypted data that is verified via zero-knowledge proof. Verification via the zero-knowledge proof enables the user to redirect the return of the digital object after the staking period has ended.

In embodiments where the identity digital object includes digital objects represented on faces, such as on a 3D object, the platform that generates the identity digital object and connects the content of cryptographic wallets to those faces is enabled to use digital objects that are staked despite those staked objects not being present in the linked wallets. The connection of the staked object to the identity digital object is made through the smart contract that stakes digital objects and/or the staking ticket object. In effect, the owner of the digital object still retains the display benefits of the digital object, but does not retain the ability to trade/transfer/sell said digital object.

In step 2014, the leaderboard revises ranks based on the stake. Stakes objects may be re-staked for longer periods by their users. Re-staking enables users to "one-up" other users on the leaderboard.

In step 2016, after the predetermined staking period ends, the digital object is returned to the original owner of the digital object. In some embodiments, the return is automatic to the original wallet that the digital object was transferred from. However, it is sometimes the case that wallets are compromised, and thus the staking ticket enables users of compromised wallets to indicate return to some other wallet.

Figure 21:
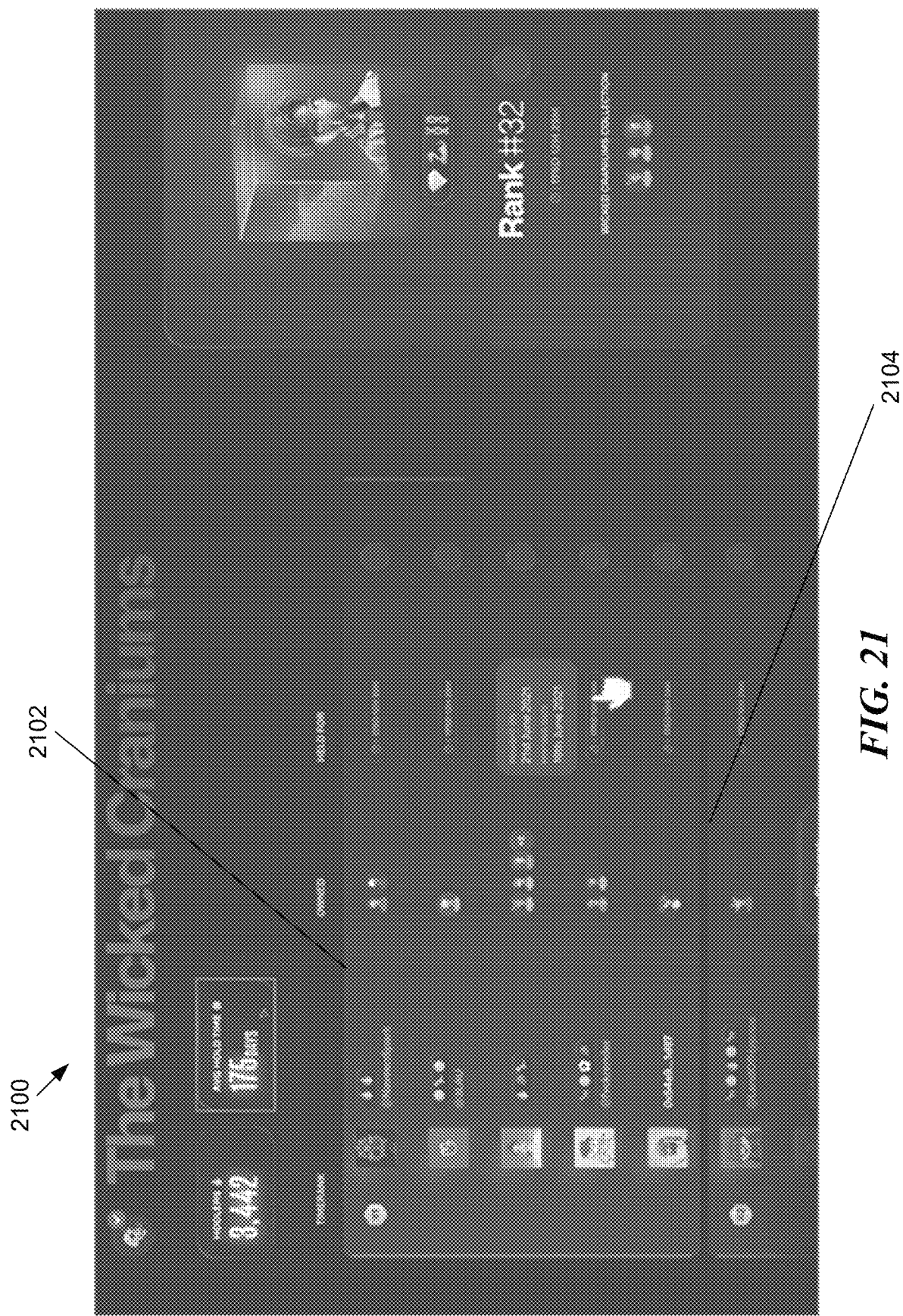
FIG. 21 is a screenshot of multiple users occupying a matching leaderboard position.

FIG. 21 is a screenshot of multiple users occupying a matching leaderboard position. The leaderboard 2100 illustrates five users tied for first place 2102 and some undetermined number of users tied for second place 2104. In some embodiments, ties on the leaderboard are permitted.

User-Centric Predictions for Digital Object Sets

Some collections of digital objects (e.g., cryptographic tokens) are created and configured with malicious intentions. Maliciously-configured digital object collections or sets may specifically be configured for malicious operations that manipulate value of digital objects held by users/holders, misrepresent value of digital assets to users, obtain private information and credentials from users/holders, and/or the like. For example, a creator of a malicious token collection may configure tokens of the malicious token collection to be perceived by potential holders as valuable (e.g., by counterfeiting or impersonating other valuable tokens, by executing a large volume of trades and activities with the tokens to artificially inflate value, by promising future incentives for holders, etc.) and/or may encourage users to participate in the malicious token collection in order to obtain cryptographic wallet keys or private information of the users without the consent of the users.

For example, an example malicious token set is created or configured for the purpose of a "rug-pull" scam. In a "rug-pull" scam, users are misled to participate in the malicious token set based on misrepresentation of future incentives, token values, and/or the like for the malicious token set. With these and other examples, detection of such malicious digital object collections (e.g., a set of cryptographic tokens) is needed. For example, failure to detect and curb a malicious digital object collection results in a significant waste of blockchain resources that are used to maintain the malicious digital object collection.

Embodiments described herein provide technical solutions that relate to predictions of maliciousness or security of a token set based on user behaviors of users that are associated with the token set. As used herein, security of a token set refers to a non-maliciousness of the token set, or the token set not being created or configured for malicious operations. In various embodiments, a model is trained to recognize user behaviors as being indicative of a likelihood of whether a set of cryptographic tokens is configured to perform malicious operations. In particular, in some embodiments, a model is trained to identify user behaviors of certain users whose involvement with a given token set increases the likelihood of the given token set being non-malicious and secure. Accordingly, the model is configured to then generate a security classification for the given token set that is centered on users involved with the given token set and their behaviors.

In various embodiments, the user behaviors trained into the model include time-rank behaviors relating to contiguous lengths of time that cryptographic tokens are held. As disclosed above, positive time-rank behavior of a user that includes extended lengths of contiguous time that the user holds onto a cryptographic token is encouraged and facilitated by a time-based leaderboard over negative time-rank behavior that includes significant turnover of cryptographic tokens by the user.

Beyond the time-based leaderboard, positive time-rank behavior of a user is correlated with the user participating in legitimate, valuable, secure, and/or non-malicious token sets; as will be understood, users are likely to spend less time holding cryptographic tokens of malicious token sets. Thus, according to embodiments described herein, a model is trained to recognize such correlations between user behaviors and token set security. A trained model provided with time-rank data for users of a given token set is configured to output a maliciousness prediction for the given token set. That is, the output of the model trained on time-rank user behaviors includes a prediction whether the given token set is configured for operations related to value manipulation, token and/or set misrepresentation, privacy violations, and/or the like).

In some embodiments, training a model with time-rank training data includes configuring model thresholds based on different portions of the training data. A trained model uses trained thresholds to discriminate between time-rank behavior indicative of token set maliciousness and time-rank behavior indicative of token set security. To train such thresholds, training data for a model includes time-rank behavior for malicious token sets and time-rank behavior for non-malicious token sets. That is, in some examples, training data for the model includes time-rank behavior labelled according to maliciousness of token sets. Thresholds are then set during model training to discriminate between the time-rank behavior for malicious token sets and the time-rank behavior for non-malicious token sets in the training data.

For example, a model is trained to identify users having continuously held cryptographic tokens for at least a threshold length of time as a positive feature for token set security. As another example, in some embodiments, a token set is assigned a positive security classification based on the token set's users holding cryptographic tokens for an average contiguous length of time longer than a threshold time. As yet another example, a trend of users associated with the token set has continuously held (or is currently holding) a cryptographic token of the token set for at least a threshold length of time results in a trained model generating a positive security classification for the token set.

In some examples, training data includes time-rank behaviors that are labelled in a user-wise manner. For example, certain users of the population of users are identified as power users (e.g., tentpole users, experienced users, etc.) whose involvement with a token set increases a likelihood that the token set is secure or non-malicious. As such, a model is trained to identify such power users as positive indicators for security of a given token set. In particular, to train the model to identify power users, the training data includes time-rank behavior corresponding to power users (e.g., via supervised training) and time-rank behavior corresponding to non-power users.

Via the supervised training, the model is trained with supervision to identify power users in a population, or to discriminate between power users and non-power users. That is, a model learns behavioral features associated with power users, and the trained model identifies a user as a power user based on the user behavior of the user including such learned features, in some embodiments. As an illustrative example, a behavioral feature associated with power users that is learned by a model via training data is holding onto cryptographic tokens for a certain length of time. If a given user has held onto cryptographic tokens for the certain length of time, the trained model identifies the given user as a power user.

Thus, training data includes historical time-rank behaviors for historical users identified as power users. For example, the historical users are manually labelled as power users, and historical time-rank behaviors corresponding to the power users are obtained. As another example, a user is automatically labelled as a power user based on certain rules or criteria, such as being involved in a number of non-malicious token sets. In some embodiments, the training data is provided to a model for supervised learning so that the model learns to identify certain users as power users based on the time-rank behavior of the certain users. That is, the model learns aspects or characteristics that define a power user from the training data.

Thus, from the training data, the model determines time-rank behavior thresholds, in some embodiments. Through comparing time-rank behavior of a given user to time-rank behavior thresholds, the model identifies the given user as a power user or not.

In some embodiments, the model generates a power user profile that represents common characteristics of historical time-rank behavior corresponding to historical power users from the training data. For example, the power user profile includes a distribution or a confidence interval of historical time-rank behavior of historical power users (e.g., an interval of average token holding time across power users). As another example, the power user profile includes a hidden state representation from a hidden layer of the trained model when provided with historical time-rank behavior corresponding to a historical power user. With the power user profile, a trained model identifies a given user as a power user or not based on whether the time-rank behavior of the given user satisfies or is similar to the power user profile.

In some embodiments, based on identification of power users involved with a given token set, a trained model generates a security classification for the given token set. For example, training data for the model includes a count or proportion of power users for each historical token set that is labelled as malicious or non-malicious. From the training data, the model learns the count or proportion of power users for the given token set as a feature for generating a security classification for the given token set. As another example, the model is configured to weight input data or features specific to power users more heavily compared to input data or feature specific to non-power users when generating a security classification for a given token set.

As yet another example, the model is configured to identify as another feature a behavior discrepancy for a power user between other token sets and a given token set. For example, a model is trained to identify that a power user on average holds cryptographic tokens for a first length of time in other token sets while only holding a cryptographic token for the given token set for a shorter length of time. The power user's negative behavior discrepancy (shorter holding in the given token set compared to other sets) by a power user increases the likelihood that the given token set is malicious. As such, the model is configured to consider behavior discrepancies of power users across token sets when generating a security classification for a given token set.

As indicated, embodiments described herein relate to security predictions and classifications for a given token set that are user-centric. In particular, a trained model generates a security classification based on user behavior data for users involved with the given token sets. The model is trained on data that describes historical user behaviors for users historically involved with token sets labelled as malicious or not. In some embodiments, the user involved with a token set include users that have held one or more cryptographic tokens of the token set, users that are currently holding one or more cryptographic tokens of the token set, users that are associated with creation or minting of one or more cryptographic tokens of the token set, administrators and/or managers related to the token set, potential holders for the token set (e.g., belonging to a target demographic related to the token set), and/or the like.

It will be appreciated that users associated with a given token set are also associated with other token sets, in some examples. In some embodiments, data that describes holistic user behavior for a user across a plurality of token sets (including a given token set for which a security classification is determined) is obtained and provided to a configured/trained model to determine inferences for the given token set. User behavior of a user in whole is used to train a model to identify a user as a power user whose involvement with a token set increases the likelihood that the token set is secure, in some embodiments.

Figure 22:
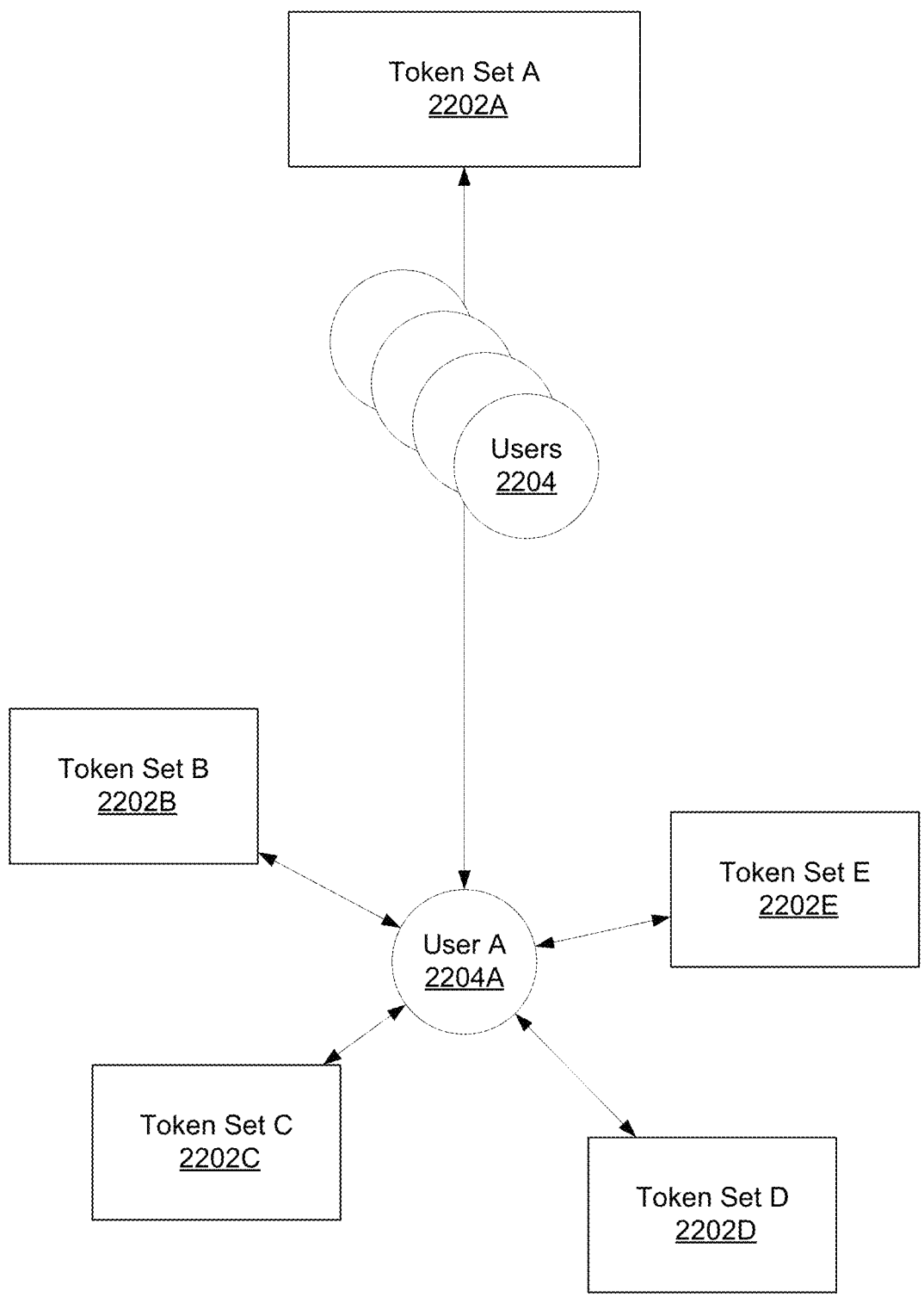
FIG. 22 is a diagram illustrating user-centric evaluation of token set security or maliciousness.

FIG. 22 is a diagram that demonstrates the determination of security classifications being centered or based on users and their behavior across a plurality of token sets. In the illustrated example, Token Set A 2202A is indicated as a token set for which a security prediction and/or classification is determined, and a plurality of users 2204 are associated with Token Set A 2202A. The users 2204 include users that have held or that currently hold cryptographic tokens of Token Set A 2202A, users associated with creation and/or management of Token Set A 2202A, and/or the like.

To determine the security prediction and/or classification for Token Set A 2202A, user behavior data for individual users of the plurality of users 2204 is obtained. For example, User A 2204A is associated with other token sets: Token Set B 2202B, Token Set C 2202C, Token Set D 2202D, and Token Set E 2202E. For example, User A 2204A has held cryptographic tokens of Token Set C 2202C at one time. As another example, User A 2204A currently holds cryptographic tokens of Token Set D 2202D at one time. As yet another example, User A 2204A minted or created cryptographic tokens of Token Set B 2202B. Accordingly, user behavior data specific to the user that relate to user activities for more than one of Token Sets A-E is obtained from an immutable distributed consensus ledger in order to determine inferences (e.g., security classifications) for one of the Token Sets A-E. In some embodiments, different token sets are linked or grouped together based on being commonly associated with a user.

Accordingly, a predicted likelihood of maliciousness for a given token set is centered on users associated with the given token set and the user behaviors that spans across different token sets (including the given token set). As described above, a model is trained to identify certain users as power users, tentpole users, experienced users, trustworthy users, and/or the like based on corresponding user behaviors that span across different token sets. For example, training data provided to a model includes, for each user labelled as a power user or not, historical user behaviors spanning across different token sets.

Using the training data, the model is trained to learn features, criteria, thresholds, rules, and/or the like that qualify a user as a power user. Accordingly, a trained model provided with user behavior for a given user identifies whether or not the given user is a power user based on identifying learned features or criteria in the user behavior for the given user. Identification as a power user is then used to generate a security classification of a token set.

In particular, in training data, a user is labelled as a power user according to time-rank behavior spanning across token sets and corresponding to the user. In an illustrative example, a user that has high time-rank behavior (e.g., holding cryptographic tokens for extended lengths of time) across multiple token sets is labelled as a power user in training data. Then, a model trained on the training data identifies a given user with similarly high time-rank behavior as a power user. The model is further trained to generate a security classification for a token set based on involvement of the power user with the token set.

In some embodiments, further to time-rank behavior, additional user behaviors (and correlations thereof with token set security/maliciousness) are also included in training data and recognized by a configured/trained model. In some embodiments, a model is trained to recognize token diversity for users associated with a given token set as a positive indicator that the given token set is not malicious. For example, a user that is associated with a high number of different token sets (e.g., high token diversity) is experienced in recognizing whether token sets are malicious or not and identified as a power user. As another example, a trained model automatically generates a positive security classification for a token set whose involved users each have at least a threshold token diversity.

Similarly, for a given token set, a model is trained to generate a security classification for the given token set based on an average token diversity per user for the given token set. For example, from training data that includes token diversities for historical token sets labelled as malicious or not, the trained model interprets whether the average token diversity per user for the given token set is indicative of maliciousness.

As another example, user behavior includes previous involvement in malicious token sets, in some embodiments. For example, a model is configured to automatically generate a negative security classification for a given token set that is created, administered, managed, and/or the like by a user that has historically or previously created, administered, or managed a malicious token set. Thus, referring back to FIG. 22, a security classification for Token Set A 2202A is determined based on security classifications for other token sets to which Token Set A 2202A is linked via a user, such as Token Set B 2202B. In some embodiments, groupings of token sets based on common association with a user have security classifications that are related to one another.

In some embodiments, participation level is another aspect of user behavior that is included in training data and recognized by a trained model to identify a power user and to generate a security classification. Generally, participation level of a user is identified as a wallet value of the user, such as a number of different cryptographic tokens held by the user or an aggregate value of all held cryptographic tokens. Accordingly, a historical user in training data is labelled as a power user according to a corresponding participation level, and a trained model identifies a user as a power user according to a corresponding participation level.

Thus, in some examples, training data is labelled, and a model is trained according to an assumption that high participation users (having high wallet values) are more cautious in participating in token sets, as participation in a malicious token set increases a likelihood of losing a significant accumulated value of the cryptographic tokens or digital objects. Thus, in some embodiments, a model is trained to exploit a correlation between a likelihood that a given token set is malicious and a participation level of users associated with the given token set (as identified via wallet value of the users).

Figure 23:
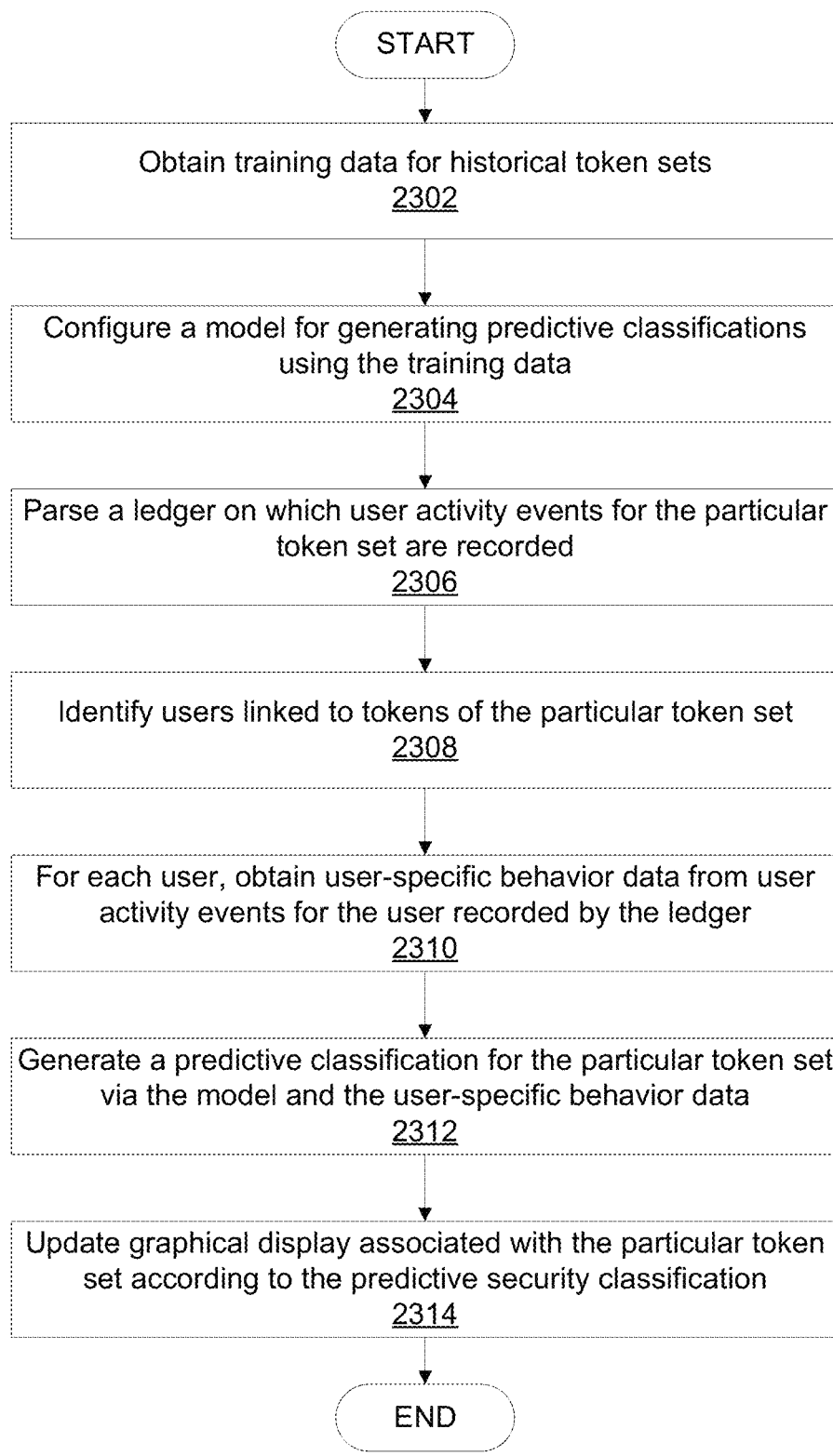
FIG. 23 is a flowchart illustrating a method for user-centric security prediction and/or classification of a set of cryptographic tokens.

Accordingly, various aspects of user behavior are correlated with token set maliciousness. Training data describing these behavioral aspects and correlations is provided to a model, and a trained model identifies such behavioral aspects in a given token set in relation to the correlations to identify power users and to generate a security classification for the given token set. Thus, technical benefits are provided through detection of malicious token sets, collections, or projects that is centered around user behavior and user-specific data for involved users. FIG. 23 is a flowchart illustrating an example method for user-centric security classification for a token set that represents a prediction as to whether the set of cryptographic tokens is configured for malicious operations.

In some embodiments, the illustrated method is implemented and performed by a system that has access to an immutable distributed consensus ledger (e.g., a blockchain) that records activity events (e.g., change in ownership of cryptographic tokens, creation or minting of cryptographic tokens, etc.) for the set of cryptographic tokens. For example, the illustrated method is implemented and performed by a node of a blockchain network (e.g., nodes 304A-E in FIG. 3), a platform in communication with a blockchain node, a server (e.g., a web server, server 310 in FIG. 3, a server in communication with a plurality of user devices), and/or the like.

As illustrated in FIG. 23, in step 2302, training data related to historical token sets is obtained. In particular, the training data includes historical ground-truth training data that indicates, for each of a plurality of historical token sets, whether or not the historical token set was created or configured for malicious operations. The training data also includes historical user-specific data associated with each of a plurality of historical token sets. For example, the historical user-specific data for a historical token set includes historical user behavior data for users associated with the historical token set.

In some examples, the historical user behavior data for users associated with the historical token set is limited to periods of time before the historical token set was determined to be malicious or not, or before the users become associated with the historical token set. In some embodiments, the training data is generated via manual annotation. For example, a human reviews historical token sets and records whether the historical token sets were shown to be malicious. In some embodiments, at least the indication of whether or not each historical token set was malicious is a previous or historical security classification generated by a model for each historical token set. For example, as a model is used to generate security classifications for token sets, the generated security classifications are used in training data to re-train the model or train other models to evaluate future token sets.

Accordingly, a model (e.g., a machine learning model) is trained to recognize certain correlations between historical token set maliciousness and historical user behaviors such that the model makes predictions related to maliciousness or security of a given token set. In step 2304, a model for generating predictive classifications for sets of cryptographic tokens is configured using the training data. In some embodiments, the model is configured or trained with the training data via supervised learning techniques, semi-supervised learning techniques, self-supervised learning techniques, and/or the like. In other embodiments, the model is a rules-based model with parameters, thresholds, and/or the like configured according to the training data.

Therefore, when introduced to historical user behaviors corresponding with non-malicious token sets and malicious token sets, the model is trained to identify users whose involvement with a token set suggests maliciousness or not. For example, via the training data, the model is trained to discriminate between time-rank behaviors of power users who likely do not participate in malicious token sets and time-rank behaviors of users who have not participated in malicious token sets. Equipped with the discrimination, the model is configured to search for and identify such power users in a given token set. Based on such power users being involved with the given token set, the model is trained to increase a likelihood of a positive security classification. Thus, training data that includes user behaviors for malicious and non-malicious token sets is used to train a model to characterize users involved with a given token set. From the characterization of the users involved with the given token set, the model is configured to generate a security classification for the given token set.

With the configuring or training of the model, the model is used (e.g., by a blockchain node, by a platform, etc.) to generate security classifications of token sets. In some embodiments, a particular token set is indicated by a request that is received by a platform, blockchain node, server, and/or the like that implements or uses the configured/trained model. For example, prior to performing blockchain operations to interact with the particular token set, a user device transmits a request that indicates the particular token set to a platform, and the platform implements the following steps of the present method to generate a security classification of the particular token set in response to the request.

In step 2306, an immutable distributed consensus ledger on which user activity events for the particular token set are recorded is parsed. For example, user activity events such as a change in ownership of a cryptographic token of the particular token set and a creation or minting of a cryptographic token of the particular token set are recorded on the immutable distributed consensus ledger (e.g., a blockchain, blockchain 802 in FIG. 8).

In recording such user activity events, the immutable distributed consensus ledger records unique identifiers associated with the involved users, such as cryptographic wallet addresses. The immutable distributed consensus ledger also records a unique identifier for each cryptographic token or digital object (e.g., a token ID) that is involved in such user activity events. Accordingly, through parsing through the immutable distributed consensus ledger, past and present holdings of specific cryptographic tokens of the particular token set are identified, along with the specific users involved with the past and present holdings.

Returning to FIG. 23, in step 2308, a plurality of users that are associated with the particular token set are identified. As indicated, users that have previously held cryptographic tokens of the particular token set and users that presently hold cryptographic tokens of the particular token set are identified based on parsing through the immutable distributed consensus ledger. Specifically, users are identified based on parsing user activity events recorded on the immutable distributed consensus ledger that pertain to the particular token set. Additionally, users that originally created or minted cryptographic tokens of the particular token set are identified from the immutable distributed consensus ledger. In some embodiments, the users are identified according to a cryptographic wallet address associated with each user that are publicly recorded on the immutable distributed consensus ledger.

In step 2310, user-specific behavior data for each user is obtained. The user-specific behavior data is obtained based on, for each user, identifying user activity events that are recorded in the immutable distributed consensus ledger that involve the user. The user activity events that involve the user include not only user activity events pertaining to the particular token set, but also user activity events that pertain to other token sets. Referring back to FIG. 22, for example, user activity events that involve User A 2204A pertain to Token Sets A-E, and the user activity events for each of Token Sets A-E involving User A 2204A are identified via the ledger.

Activity involving the user that is recorded on the ledger is identified based on the ledger recording the cryptographic wallet address associated with the user. Thus, by examining every user activity event recorded by the ledger that includes the cryptographic wallet address for the user, user-specific behavior data is obtained. In some embodiments, the user activity events that involve the user are identified using a distributed application (dApp) configured as a ledger interfacing program. For example, the dApp is configured to receive a cryptographic wallet address for a given user as input and to output a list of user activity events that involve the given user from parsing the ledger. In some examples, the dApp returns the list of user activity events, and a platform or a system performs off-chain operations to generate the user-specific behavior data from the list of user activity events. In other examples, the dApp returns user-specific behavior data for a given user that is indicated as input to the dApp.

As discussed above, user-specific behavior data for a user generally refers to data that described on-chain activity and interactions of the user with cryptographic tokens, digital objects, on-chain assets, and/or the like. In some embodiments, the user-specific behavior data includes different behavioral aspects including lengths of time that a user has held cryptographic tokens, a number of different cryptographic tokens held by the user, a number of different token sets in which the user is involved, a number of malicious token sets in which the user was involved, a number of different cryptographic tokens or token sets that the user has created, and/or the like. It will be appreciated that various aspects of the user-specific behavior data is averaged, represented as the maximum value, represented as the minimum value, summed, and/or the like, depending on the embodiment.

In some examples, user behavior data is obtained off-chain from time-based leaderboards for various token sets. In doing so, some user behavior data is obtained more efficiently (e.g., without significant parsing of the immutable distributed consensus ledger) and without relying on connectivity with a blockchain network.

As discussed, from the obtained user-specific behavior data, the trained model characterizes the users associated with the particular token set and identify whether any of the users are power users, tentpole users, experienced users, trustworthy users, and/or the like. That is, the trained model identifies whether any of the users are users whose involvement with the particular token set increases the likelihood that the particular token set is non-malicious. In some embodiments, the trained model similarly identifies whether any of the users are users whose involvement with the particular token set increases the likelihood that the particular token set is malicious (e.g., users who are frequently involved with malicious sets).

Returning to FIG. 23, in step 2312, a predictive security classification for the particular token set is generated via the model and the user-specific behavior data. Specifically, in some embodiments, the user-specific behavior data is provided as input to the model, and the model outputs a weighted value, a binary classification, and/or the like from which the predictive security classification is generated. In some embodiments, the predictive security classification is a positive security classification that represents a prediction that the particular token set is not malicious, or the predictive security classification is a negative security classification that represents a prediction that the particular token set is malicious. In some embodiments, the model is used to generate the predictive security classification based on comparing aspects of the user-specific behavior data (e.g., contiguous lengths of time for holding tokens, token diversity, token set diversity, previous malicious token sets, etc.) against respective thresholds. In some embodiments, the model identifies trends of common user behaviors in the population of users associated with the particular token set, and the predictive security classification is generated based on these trends.

In some embodiments, the security classification is generated based on the identification of power users. For example, as described above, a count or proportion of power users out of an involved population of users is compared against a threshold of the trained model to generate the security classification. As another example, the trained model weights user-specific behavior data that corresponds to the identified power users more heavily when generating the security classification.

In some embodiments, other features other than user-specific behavior are provided as input to the model to generate the predictive security classification. For example, set-specific data for the particular token set is obtained and provided to the model. In some embodiments, set-specific data includes a number of users currently involved with the particular token set, a total number of users that have been involved with the particular token set, a number of cryptographic tokens in the particular token set, a length of time since the first cryptographic token was created or minted, a length of time since the particular token set was made public, and/or the like.

In step 2314, a graphical display associated with the particular token set is updated according to the predictive security classification that is generated for the particular token set. In some embodiments, graphical display of cryptographic tokens of the particular token set is updated to reflect the predictive security classification of the particular token set.

Figure 24:
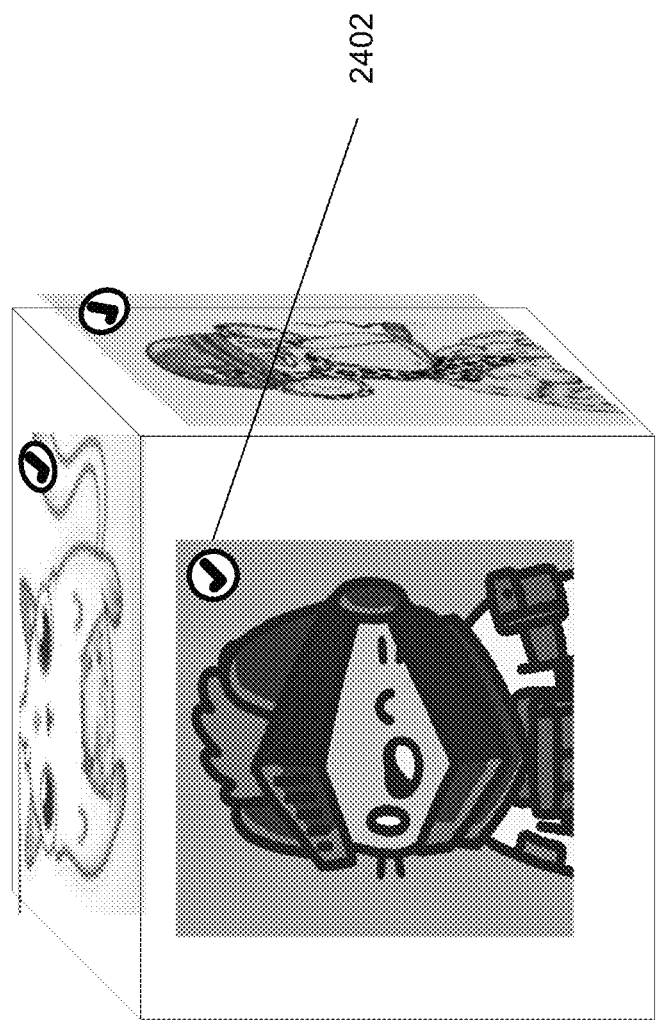
FIG. 24 is an illustration of an example graphical display that represents digital objects.

FIG. 24 provides an example of a graphical display of cryptographic tokens being updated according to user-centric security classifications for the token sets to which the tokens belong. For example, in FIG. 24, cryptographic tokens belonging to a token set having a positive security classification are displayed with a checkmark 2402 or similar positive indication. The checkmark 2402 or similar positive indications are configured to indicate to users that the token set is predicted to be secure or non-malicious. In some embodiments, graphical display of the particular token set (e.g., among or with other token sets) is updated to reflect the predictive security classification of the particular token set.

Figure 25:
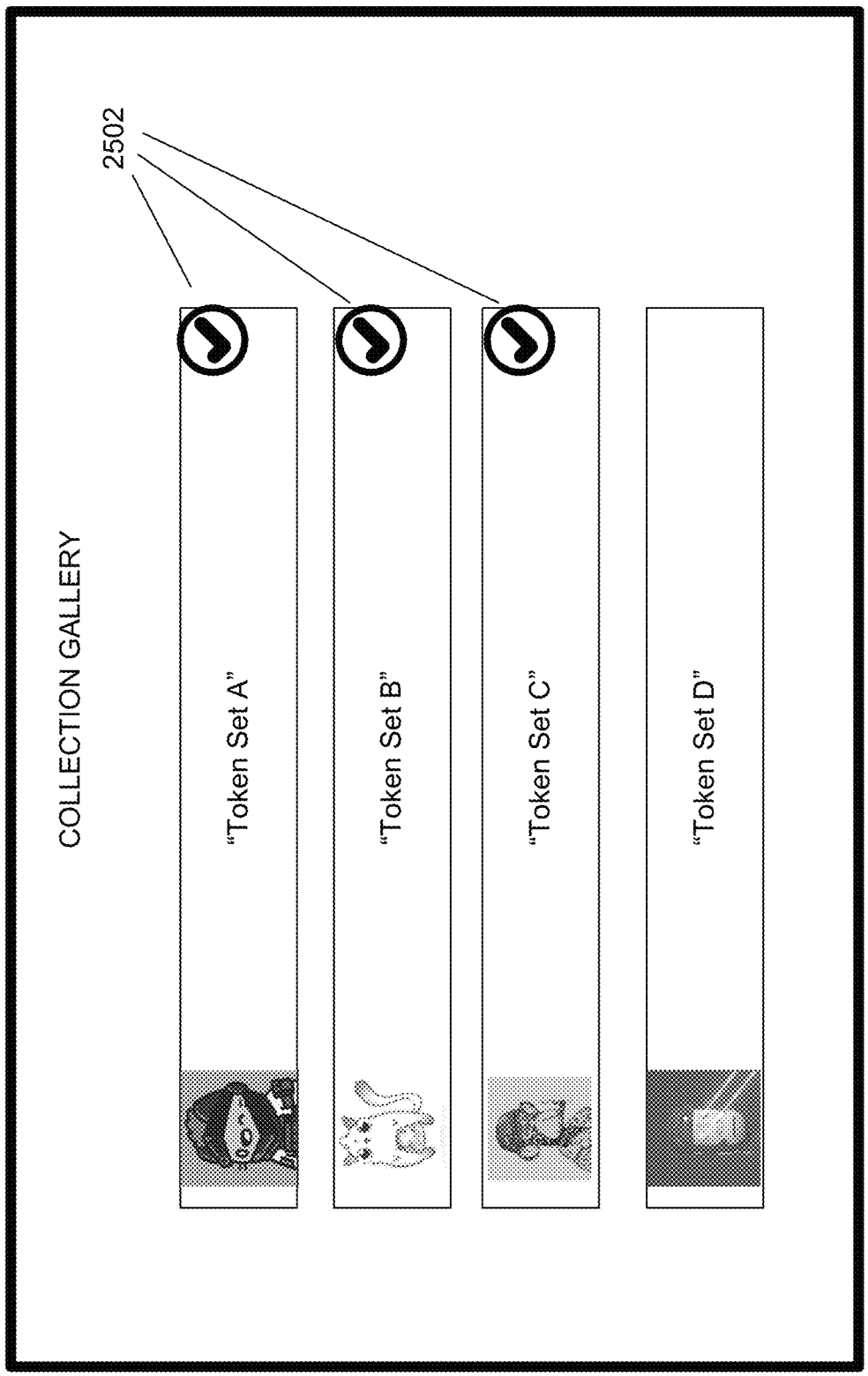
FIG. 25 is an illustration of an example graphical display that indicates sets of cryptographic tokens.

FIG. 25 provides an example of a graphical display of four token sets being updated according to the user-centric security classifications, with some of the token sets being displayed with a positive indication 2502 that indicates to users that the token sets are predicted to be secure or non-malicious.

Thus, according to embodiments described herein, predictions that relate to whether token sets are configured for malicious operations are generated according to behaviors of users involved with the token sets. In some embodiments, a prediction (e.g., a predictive security classification) for a particular token set is updated or regenerated responsive to a new user holding a cryptographic token of the particular token set or otherwise becoming associated with the particular token set.

Similarly, in some embodiments, the prediction for the particular token set is updated or regenerated responsive to a new user activity events for the particular token set being recorded on the immutable distributed consensus ledger. Accordingly, a particular token set is repeatedly evaluated responsive to continuous monitoring of the immutable distributed consensus ledger. With groupings or linkages of token sets by common association with a user, the prediction for the particular token set is updated or regenerated responsive to a change in the prediction for another token set in the same grouping or linking, in some embodiments.

Interrelation of Digital Objects

In some embodiments digital objects interrelate and have functionality with one another. Described below are a number of embodiments of interrelation:

A) a first digital object is enabled to generate further derivative digital objects. The derivative digital objects may be distributed at will, but if the first digital object changes possession, all derivative digital objects deactivate. For purposes of this disclosure and other examples, the term "Deactivate" refers to any of: losing all functionality, losing any user decipherable representation, and/or being deleted. Various embodiments implement deactivation either through internal programing of the digital object, or as conditions within a smart contract the digital object is associated with. A user decipherable representation refers to visual representations or data that is intended to be read by humans (e.g., not hash values). Examples include identity data that identifies the owner of the digital object.

B) a first digital object is an NFT and is associated with a cryptographic wallet. Contents of the cryptographic wallet are used as the input used to generate the first digital object. Where any of the original input are transferred away from the cryptographic wallet, the first digital object is deactivated.

C) a first digital object is an NFT and is associated with a cryptographic wallet. Contents of the cryptographic wallet are used as the input used to generate the first digital object. Where the first digital object is transferred away from the cryptographic wallet, the first digital object is deactivated.

D) a first digital object is an NFT and is associated with a cryptographic wallet. Contents of the cryptographic wallet are used as the input used to generate the first digital object. Where the content of the cryptographic wallet changes, data associated with the digital object also changes. For example, where a new NFT is added to the cryptographic wallet, a visual representation of the digital object is updated to include reference to or elements of the new NFT that has been added. The update to the digital object enables the digital object to evolve as changes occur to the cryptographic wallet.

In some embodiments of the evolving digital object, the digital object generation platform is executed subsequent times to modify the original digital object. The input scheme of evolving digital objects accommodates multiple schema. For example, in some embodiments, the visual representation of the digital object is remade from the current existing input (e.g., deleted and re-created). In other embodiments, the existing visual representation is used as a base element that is modified or embellished based on the changes to the cryptographic wallet. Where the existing visual representation is used as a base element, additional weight is given to the existing visual representation in the machine learning models such that the output remains recognizable as having originated from the base element.

In each of the examples above, some alternate embodiments replace deactivation with a broader modification. For example, some or part of the human decipherable content is deleted or changed. Where the digital object carried identity information, the visual representation may remain, but the identity portion may be deleted or updated to a new owner.

Where the digital object is an NFT that is modified, the changes to the NFT occur in the smart contract from which the NFT is associated. Changes to the visual representation or other data associated with the NFT are based on how the smart contract encodes cryptographic data of the NFT to human decipherable components. Where human decipherable elements are modified, no change need by made to cryptographic elements of the NFT. Where cryptographic elements of the NFT are changed, those changes are based upon conditions precedent within the smart contract (e.g., a process for revocation of a cryptographic token).

Computing Platform

Figure 26:
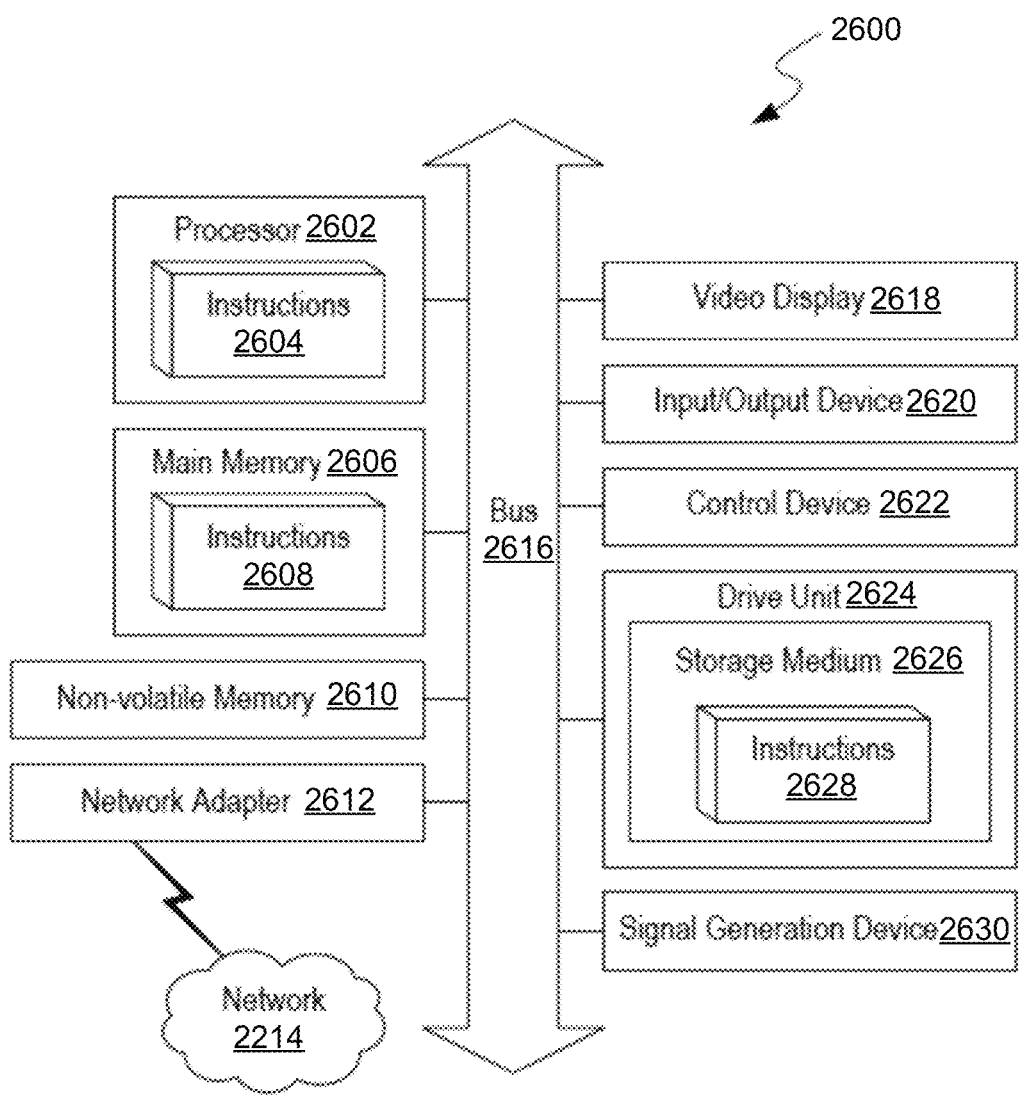
FIG. 26 is a block diagram of an exemplary computing system.

FIG. 26 is a block diagram illustrating an example computer system 2600, in accordance with one or more embodiments. In some embodiments, components of the example computer system 2600 are used to implement the software platforms described herein. At least some operations described herein can be implemented on the computer system 2600.

The computer system 2600 can include one or more central processing units ("processors") 2602, main memory 2606, non-volatile memory 2610, network adapters 2612 (e.g., network interface), video displays 2618, input/output devices 2620, control devices 2622 (e.g., keyboard and pointing devices), drive units 2624 including a storage medium 2626, and a signal generation device 2620 that are communicatively connected to a bus 2616. The bus 2616 is illustrated as an abstraction that represents one or more physical buses and/or point-to-point connections that are connected by appropriate bridges, adapters, or controllers. The bus 2616, therefore, can include a system bus, a Peripheral Component Interconnect (PCI) bus or PCI-Express bus, a HyperTransport or industry standard architecture (ISA) bus, a small computer system interface (SCSI)

bus, a universal serial bus (USB), IIC (I2C) bus, or an Institute of Electrical and Electronics Engineers (IEEE) standard 1394 bus (also referred to as "Firewire").

The computer system 2600 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 2600.

While the main memory 2606, non-volatile memory 2610, and storage medium 2626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2628. The term "machine-readable medium" and "storage medium" shall also be taken to include any medium that is capable of storing, encoding, or carrying a set of instructions for execution by the computer system 2600. In some embodiments, the non-volatile memory 2610 or the storage medium 2626 is a non-transitory, computer-readable storage medium storing computer instructions, which can be executed by the one or more central processing units ("processors") 2602 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 2604, 2608, 2628) set at various times in various memory and storage devices in a computer device. When read and executed by the one or more processors 2602, the instruction(s) cause the computer system 2600 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2610, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 2612 enables the computer system 2600 to mediate data in a network 2614 with an entity that is external to the computer system 2600 through any communication protocol supported by the computer system 2600 and the external entity. The network adapter 2612 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 2612 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 2700 illustrated and described in more detail with reference to FIG. 27.

Machine Learning System

Figure 27:
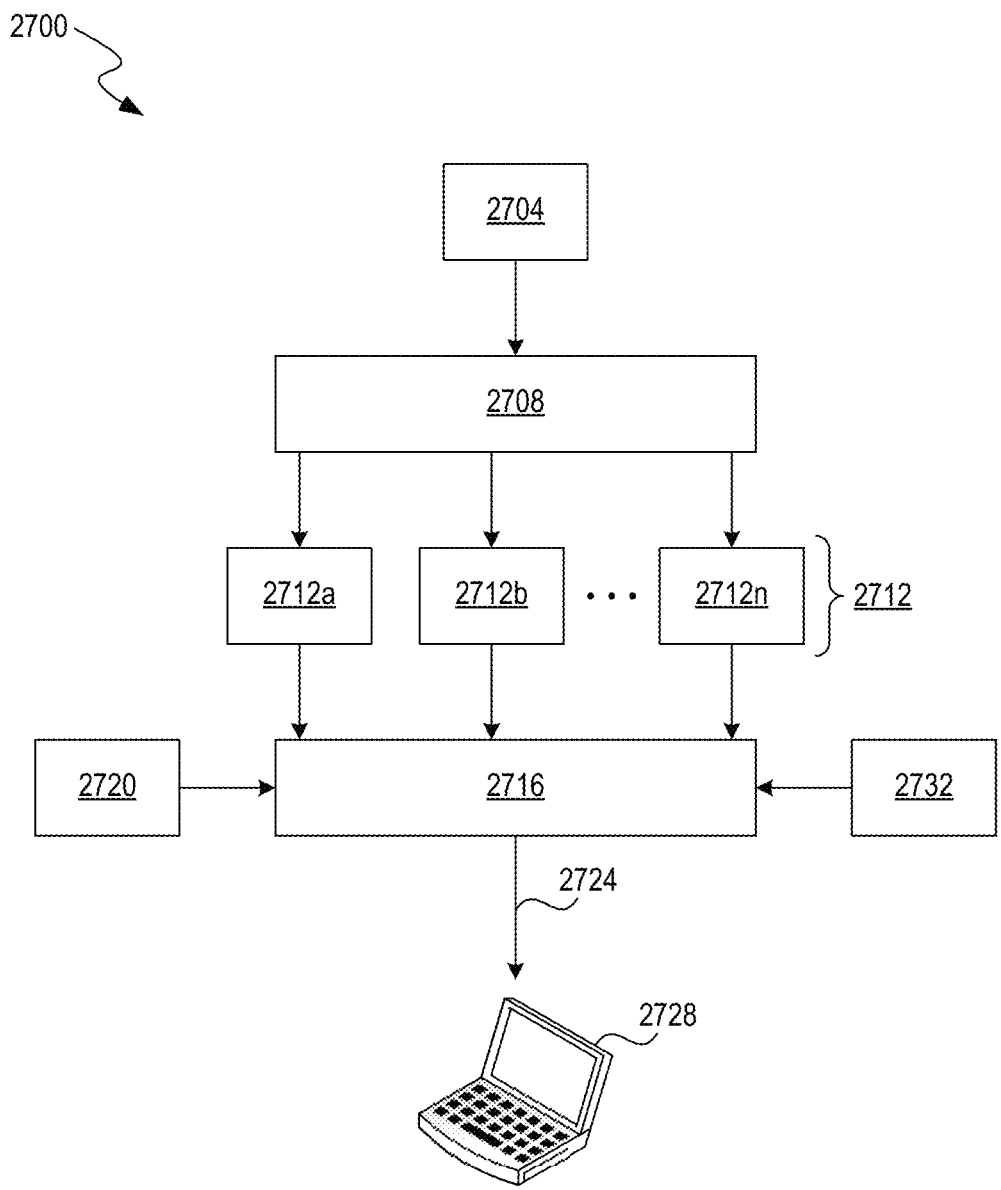
FIG. 27 is a block diagram illustrating an example machine learning (ML) system, in accordance with one or more embodiments

FIG. 27 is a block diagram illustrating an example ML system 2700, in accordance with one or more embodiments. The ML system 2700 is implemented using components of the example computer system 2600 illustrated and described in more detail with reference to FIG. 26. Likewise, embodiments of the ML system 2700 can include different and/or additional components or be connected in different ways. The ML system 2700 is sometimes referred to as a ML module.

The ML system 2700 includes a feature extraction module 2708 implemented using components of the example computer system 2600 illustrated and described in more detail with reference to FIG. 26. In some embodiments, the feature extraction module 2708 extracts a feature vector 2712 from input data 2704. For example, the input data 2704 can include one or more images, sets of text, audio files, or video files. The feature vector 2712 includes features 2712a, 2712b, . . . 2712n. The feature extraction module 2708 reduces the redundancy in the input data 2704, e.g., repetitive data values, to transform the input data 2704 into the reduced set of features 2712, e.g., features 2712a, 2712b, . . . 2712n. The feature vector 2712 contains the relevant information from the input data 2704, such that events or data value thresholds of interest can be identified by the ML model 2716 by using this reduced representation. In some example embodiments, dimensionality reduction techniques, such as principal component analysis (PCA) or autoencoders are used by the feature extraction module 2708.

In alternate embodiments, the ML model 2716 performs deep learning (also known as deep structured learning or hierarchical learning) directly on the input data 2704 to learn data representations, as opposed to using task-specific algorithms. In deep learning, no explicit feature extraction is performed; the features 2712 are implicitly extracted by the ML system 2700. For example, the ML model 2716 can use a cascade of multiple layers of nonlinear processing units for implicit feature extraction and transformation. Each successive layer uses the output from the previous layer as input. The ML model 2716 can learn in supervised (e.g., classification) and/or unsupervised (e.g., pattern analysis) modes. The ML model 2716 can learn multiple levels of representations that correspond to different levels of abstraction, wherein the different levels form a hierarchy of concepts. In this manner, the ML model 2716 can be configured to differentiate features of interest from background features.

In alternative example embodiments, the ML model 2716, e.g., in the form of a CNN generates the output 2724, without the need for feature extraction, directly from the input data 2704. The output 2724 is provided to the computer device 2728. The computer device 2728 is a server, computer, tablet, smartphone, smart speaker, etc., implemented using components of the example computer system 2600 illustrated and described in more detail with reference to FIG. 26. In some embodiments, the steps performed by the ML system 2700 are stored in memory on the computer device 2728 for execution. In other embodiments, the output 2724 is displayed on high-definition monitors.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 2716 can be a CNN that includes both convolutional layers and max pooling layers. The architecture of the ML model 2716 can be "fully convolutional," which means that variable sized sensor data vectors can be fed into it. For all convolutional layers, the ML model 2716 can specify a kernel size, a stride of the convolution, and an amount of zero padding applied to the input of that layer. For the pooling layers, the ML model 2716 can specify the kernel size and stride of the pooling.

In some embodiments, the ML system 2700 trains the ML model 2716, based on the training data 2720, to correlate the feature vector 2712 to expected outputs in the training data 2720. As part of the training of the ML model 2716, the ML system 2700 forms a training set of features and training labels by identifying a positive training set of features that have been determined to have a desired property in question and a negative training set of features that lack the property in question. The ML system 2700 applies ML techniques to train the ML model 2716, that when applied to the feature vector 2712, outputs indications of whether the feature vector 2712 has an associated desired property or properties.

The ML system 2700 can use supervised ML to train the ML model 2716, with features from the training sets serving as the inputs. In some embodiments, different ML techniques, such as support vector machine (SVM), regression, naïve Bayes, random forests, neural networks, etc., are used. In some example embodiments, a validation set 2732 is formed of additional features, other than those in the training data 2720, which have already been determined to have or to lack the property in question. The ML system 2700 applies the trained ML model 2716 to the features of the validation set 2732 to quantify the accuracy of the ML model 2716. In some embodiments, the ML system 2700 iteratively re-trains the ML model 2716 until the occurrence of a stopping condition, such as the accuracy measurement indication that the ML model 2716 is sufficiently accurate, or a number of training rounds having taken place.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A system for user-centric security classifications for sets of cryptographic tokens, the system comprising a processor and a memory storing instructions that, when executed by the processor, cause the system to:
configure a first model for generating a predictive classification for a given token set from input user-specific data associated with the given token set, wherein the first model is trained using historical ground-truth training data (i) that indicates whether or not each of a plurality of historical token sets were determined to perform malicious operations and (ii) that includes historical user-specific data associated with the plurality of historical token sets;
identify, based on parsing an immutable distributed consensus ledger on which user activity events for a particular token set are recorded, a plurality of particular users linked to cryptographic tokens of the particular token set;
for each particular user of the identified plurality of particular users:
identify, via the immutable distributed consensus ledger, a plurality of user activity events that involve the particular user across a plurality of token sets, the plurality of token sets including the particular token set, and
from the plurality of user activity events, obtain time data for the particular user that includes, for each of the plurality of token sets, a length of time during which the particular user is contiguously linked to a cryptographic token of each of the plurality of token sets;

generate, using at least the time data for each user as a model input for the first model, a predictive security classification for the particular token set that represents a likelihood that the particular token set is configured for performing malicious operations, wherein the predictive security classification is a positive predictive security classification based on the time data for each user including lengths of time longer than a threshold length; and automatically update a graphical display of a list of token sets that includes the particular token set according to the predictive security classification for the particular token set.

2. The system of claim 1, wherein the instructions further cause the system to:

detect, via the immutable distributed consensus ledger, a new user that becomes linked to a cryptographic token of the particular token set;

obtain new user-specific data for the new user that describes linkage of the new user with one or more other token sets;

update the security classification for the particular token set based on the new user-specific data; and indicate an updated security classification to the identified plurality of users linked to the cryptographic tokens of the particular token set.

3. A method for predictive classification of a set of cryptographic tokens, the method comprising:

for a particular token set, identifying a plurality of users having interactions with cryptographic tokens of the particular token set via parsing of an immutable distributed consensus ledger that records user activity events for the particular token set;

obtaining, from the immutable distributed consensus ledger, user-specific data for each of the plurality of users, wherein the user-specific data for each user includes time data describing a length of time that the user has been contiguously linked to cryptographic tokens of a plurality of token sets that includes the particular token set;

generating, by a predictive model configured to receive the user-specific data as a model input, a security classification for the particular token set that represents a predicted likelihood of whether or not the particular token set is configured for performing malicious operations, wherein the security classification is a positive predictive security classification based on the time data for each user including lengths of time longer than a threshold length; and automatically updating a graphical display of a list of token sets that includes the particular token set according to the predictive security classification for the particular token set.

4. The method of claim 3, wherein the predictive model is trained for generating the security classification in accordance with historical ground-truth training data that indicates whether or not each of a plurality of historical token sets were determined to perform malicious operations.

5. The method of claim 4, wherein the predictive model includes a machine learning model.

6. The method of claim 3, wherein the plurality of users includes one or more users associated with creation of cryptographic tokens of the particular token set, and wherein the security classification for the particular token set is generated based on the user-specific data for the one or more users associated with the creation of the cryptographic tokens of the particular token set.

7. The method of claim 3, wherein the security classification is generated to be a positive security classification that represents a predicted likelihood that the particular token set is not configured for performing malicious operations based at least on the user-specific data for each user indicating that each user is linked to at least a threshold number of different token sets.

8. The method of claim 3, wherein the security classification is generated to be a positive security classification that represents a predicted likelihood that the particular token set is not configured for performing malicious operations based at least on the user-specific data for each user indicating that each user is linked to at least a threshold number of different cryptographic tokens across the plurality of token sets that includes the particular token set.

9. The method of claim 3, wherein the security classification is generated to be a negative security classification that represents a predicted likelihood that the particular token set is configured for performing malicious operations based at least on the user-specific data for one or more of the plurality of particular users indicating an association between the one or more of the plurality of particular users and a token set having a respective negative security classification.

10. The method of claim 3, wherein the security classification is generated based on set-specific data including a number of different users and a length of time since a creation of the particular token set.

11. The method of claim 3, further comprising automatically updating a second graphical display of cryptographic tokens of the particular token set to indicate the security classification for the particular token set.

12. The method of claim 3, wherein the user-specific data for each of the plurality of users is obtained via a ledger interfacing program configured to indicate a plurality of user activity events involving each user in response to a ledger address associated with each user.

13. The method of claim 3, further comprising:

detecting, via the immutable distributed consensus ledger, a new user activity event for the particular token set that involves a given user;

obtaining new user-specific data for the given user that describes a plurality of user activity events that involve the given user for the plurality of token sets that includes the particular token set;

updating the security classification for the particular token set based on the new user-specific data; and indicating an updated security classification to the identified plurality of users.

14. A non-transitory computer program product storing executable instructions thereon, the instructions configured to cause a processor to perform operations comprising:

identifying a plurality of users associated with a token set based on parsing of an immutable distributed consensus ledger that tracks user linkage for the token set;

obtaining historical activity data for the plurality of users, wherein the historical activity data includes time data indicating a length of time that each user of the plurality of users has been contiguously associated with cryptographic tokens of each of a plurality of token sets that includes the token set;

generating a security classification for the token set that represents a predicted likelihood of whether or not the token set is configured for performing malicious operations based on providing the historical activity data for each user to a predictive model, wherein the security classification is a positive predictive security classification based on the time data for each user including lengths of time longer than a threshold length; and automatically updating a graphical display of a list of token sets that includes the token set according to the security classification for the token set.

15. The non-transitory computer program product of claim 14, wherein the historical activity data for the plurality of users is obtained via the immutable distributed consensus ledger using a ledger address associated with each user of the plurality of users.

16. The non-transitory computer program product of claim 14, wherein the plurality of users associated with the token set includes a user associated with creation of the token set.

17. The non-transitory computer program product of claim 14, wherein the security classification for the token set is generated to indicate a predicted likelihood that the token set is not configured to perform malicious operations based at least on the length of time indicated by the historical activity data for each user being longer than a threshold time.

18. The non-transitory computer program product of claim 14, wherein the security classification for the token set is generated based at least on a respective security classification for at least one other token set of the plurality of token sets with which the plurality of users is associated.

19. The non-transitory computer program product of claim 14, wherein the historical activity data for the plurality of users includes an average length of time that a user of the plurality of users has been contiguously linked to a cryptographic token.

20. The non-transitory computer program product of claim 14, wherein the operations further comprise updating a graphical display of cryptographic tokens of the token set to reflect the security classification for the token set.

* * * * *